(12) United States Patent
Fukuda et al.

(10) Patent No.: US 8,849,953 B2
(45) Date of Patent: Sep. 30, 2014

(54) TERMINAL DEVICE, DATA RECEIVING METHOD, DATA RECEIVING PROGRAM, AND RECORDING MEDIUM

(75) Inventors: Yasuko Fukuda, Shinagawa-ku (JP);
Ryohei Takuma, Shinagawa-ku (JP);
Yusuke Sasamori, Shinagawa-ku (JP)

(73) Assignee: Rakuten, Inc., Tokyo (JP)

(*) Notice: Subject to any disclaimer, the term of this patent is extended or adjusted under 35 U.S.C. 154(b) by 0 days.

(21) Appl. No.: 13/880,785

(22) PCT Filed: Jan. 24, 2012

(86) PCT No.: PCT/JP2012/051442
§ 371 (c)(1),
(2), (4) Date: Apr. 22, 2013

(87) PCT Pub. No.: WO2012/147380
PCT Pub. Date: Nov. 1, 2012

(65) Prior Publication Data
US 2013/0212220 A1 Aug. 15, 2013

(30) Foreign Application Priority Data

Apr. 27, 2011 (JP) ................. 2011-098955

(51) Int. Cl.
| | |
|---|---|
| G06F 15/16 | (2006.01) |
| H04L 29/08 | (2006.01) |
| H04W 36/28 | (2009.01) |
| H04M 3/51 | (2006.01) |
| H04W 84/12 | (2009.01) |
| H04W 36/14 | (2009.01) |
| H04W 48/18 | (2009.01) |
| H04W 88/06 | (2009.01) |

(52) U.S. Cl.
CPC ............. *H04L 67/32* (2013.01); *H04W 36/28* (2013.01); *H04M 3/5166* (2013.01); *H04W 84/12* (2013.01); *H04W 88/06* (2013.01); *H04W 36/14* (2013.01); *H04W 48/18* (2013.01)
USPC .......................................... 709/217; 709/203

(58) Field of Classification Search
USPC .................................................. 709/203, 217
See application file for complete search history.

(56) References Cited

U.S. PATENT DOCUMENTS 7,003,280 B2 * 2/2006 Pelaez et al. .................. 455/406
7,546,125 B2 * 6/2009 Sharma et al. ................ 455/436
(Continued)

FOREIGN PATENT DOCUMENTS

EP 1 439 725 A1 7/2004
JP 2004-62671 A 2/2004
(Continued)

OTHER PUBLICATIONS

International Search Report for PCT/JP2012/051442 dated Feb. 21, 2012.
(Continued)

*Primary Examiner* — Duyen Doan
(74) *Attorney, Agent, or Firm* — Sughrue Mion, PLLC

(57) ABSTRACT

A terminal device can connect to a first network whose communication speed is high or whose communication fee charged according to an amount of communication is low and a second network whose communication speed is lower than that of the first network or whose communication fee charged according to an amount of communication is higher than that of the first network. The terminal device first data with a large amount of data through the first network and stores the first data. Also, the terminal device second data with an amount of data smaller than that of the first data through the second network and stores the second data. The terminal device determines a connection state of the network and a storage state of data and controls reception of data used to output contents on the basis of the determination result.

6 Claims, 8 Drawing Sheets

(56) References Cited

U.S. PATENT DOCUMENTS

| | | | |
|---|---|---|---|
| 7,962,148 B2* | 6/2011 | Stamoulis et al. | 455/453 |
| 8,284,797 B2* | 10/2012 | Mosig | 370/466 |
| 8,369,281 B2* | 2/2013 | Denny et al. | 370/331 |
| 8,478,880 B2* | 7/2013 | Finkelstein et al. | 709/227 |
| 2004/0023669 A1* | 2/2004 | Reddy | 455/456.1 |
| 2006/0056349 A1* | 3/2006 | Nakatugawa et al. | 370/331 |
| 2006/0109343 A1 | 5/2006 | Watanabe et al. | |
| 2006/0121894 A1* | 6/2006 | Ganesan | 455/432.1 |
| 2008/0195664 A1* | 8/2008 | Maharajh et al. | 707/104.1 |
| 2008/0200154 A1* | 8/2008 | Maharajh et al. | 455/414.3 |
| 2009/0124284 A1* | 5/2009 | Scherzer et al. | 455/552.1 |
| 2009/0232088 A1 | 9/2009 | Wisely | |
| 2010/0081428 A1* | 4/2010 | Maejima et al. | 455/426.1 |
| 2012/0096144 A1* | 4/2012 | Ledlie | 709/224 |
| 2012/0184242 A1* | 7/2012 | Li et al. | 455/406 |

FOREIGN PATENT DOCUMENTS

| | | |
|---|---|---|
| JP | 2006-49964 A | 2/2006 |
| JP | 2007-129472 A | 5/2007 |
| JP | 2011-70583 A | 4/2011 |

OTHER PUBLICATIONS

Taiwanese Office Action issued Mar. 19, 2013 in a corresponding Taiwanese Patent Application No. 101103796.

* cited by examiner

TERMINAL DEVICE, DATA RECEIVING METHOD, DATA RECEIVING PROGRAM, AND RECORDING MEDIUM

CROSS REFERENCE TO RELATED APPLICATIONS

This application is a National Stage of International Application No. PCT/JP2012/051442 filed Jan. 24, 2012, claiming priority based on Japanese Patent Application No. 2011-098955 filed Apr. 27, 2011, the contents of all of which are incorporated herein by reference in their entirety.

TECHNICAL FIELD

The present invention relates to a technical field of a terminal device which can connect to a plurality of networks and which receives data, which is used to output contents, through the connected network.

BACKGROUND ART

Conventionally, a terminal device that can connect to a plurality of networks is known. For example, in recent years, mobile communication terminals such as smart phones which can connect to a third-generation mobile communication network (hereinafter referred to as "3G network") and a wireless LAN (Local Area Network) have become widely used.

For example, such a terminal device connects to a network selected by a user or connects to a network automatically selected according to a radio wave condition among a plurality of networks. For example, the terminal device receives image data, moving image data, and sound data through the connected network and outputs (displays) an image or a moving image on a screen or outputs sound on the basis of the received data.

As the computer technology advances, the processing capacity of terminal devices is gradually increased. Therefore, for example, the terminal devices can easily display high quality image and moving image and output high quality sound. As the quality of contents improves, the amount of data of the contents increases.

On the other hand, the communication speed (transmission rate) of packet communication and the fee system may be different for each network to which the terminal device can connect. For example, the communication speed of the 3G network is generally lower than that of the wireless LAN. The fee system of the 3G network is generally a pay-as-you-go system. On the other hand, the fee system of the wireless LAN is generally a flat-rate system. In some wireless LANs, the communication fee is free.

When there are different communication speeds and different fee systems, if the terminal device receives data through a network having a higher communication speed, the time required to receive data is shortened. When the terminal device receives data through a network where the fee system is the flat-rate system or the communication fee is free, a communication fee according to the amount of received data is not charged to a user. In other words, these networks are preferable for the user. When the terminal device can connect to a plurality of networks where the fee system is the pay-as-you-go system, it is preferable for the user that the terminal device receives data through a network where the communication fee charged per amount of data is lower.

However, there is a case in which the terminal device cannot connect to a network preferable to the user depending on, for example, place, time, radio wave condition, and the like. In this case, the terminal device has to receive data through a network whose communication speed is lower or a network whose communication fee charged according to the amount of communication is higher.

Regarding the above problem, Patent Literature 1 discloses a technique in which a wireless communication terminal determines whether the type of used communication service is the flat-rate system or the pay-as-you-go system, and when the type is the pay-as-you-go system, the wireless communication terminal can select low quality image data from high quality image data which is image data with high resolution and low quality image data which is image data with low resolution and download the low quality image data. In other words, in the technique described in Patent Literature 1, when the type of the communication service is the pay-as-you-go system, image data having a smaller amount of data is downloaded.

CITATION LIST

Patent Literature

Patent Literature 1: Japanese Patent Application Laid-Open (JP-A) No. 2007-129472

SUMMARY OF INVENTION

Technical Problem

However, in the technique disclosed in Patent Literature 1, image data used to display an image is selected according to the type of used communication service and the selected image data is downloaded. Therefore, when the type of the used communication service is the pay-as-you-go system, low quality image data is downloaded even if high quality image data has been downloaded before. Thus, an image with low resolution is displayed on the basis of the low quality image data. Even though the low quality image data is data having a smaller amount of data, a communication fee based on the receiving amount of the low quality image data is charged to the user. When the terminal device receives low quality image data from a network with lower communication speed among a plurality of networks having communication speeds different from each other, even though the low quality image data is data having a smaller amount of data, the time required to receive data increases due to the low communication speed.

The present invention is made in view of the above points, and an object of the present invention is to provide a terminal device, a data receiving method, a data receiving program, and a recording medium in which, in a terminal device which can connect to a plurality of networks, whose communication speeds and/or communication fees charged according to the amount of communication are different from each other, and receives data of an amount of data according to a connected network, it is possible to increase chances that data having a greater amount of data is used to output contents while reducing the amount of data received from a network whose communication speed is lower or a network whose communication fee charged according to the amount of communication is higher.

Solution to Problem

In order to achieve the above object, an invention described in claim 1 is a terminal device that receives data, which is used to output contents, through at least either one of a first network and a second network being at least either one of a network whose communication speed is lower than that of the first network and a network whose communication fee charged according to an amount of communication is higher than that of the first network, the terminal device comprising: a connection determination means that determines whether or not the terminal device is connected to the first network; a first storage determination means that determines whether or not first data and second data are stored in a storage means, an amount of data of the second data being smaller than that of the first data; a receiving means that receives the first data through the first network when it is determined that the terminal device is connected to the first network and receives the second data through the second network when it is determined that the terminal device is not connected to the first network and the first data is not stored in the storage means; a control means that stores data received by the receiving means in the storage means; and an output means that outputs the contents based on the first data when it is determined that the first data is stored in the storage means and outputs the contents based on the second data when it is determined that only the second data is stored in the storage means.

According to this invention, if the first data has already been stored, even if the terminal device is not connected to the first network, contents are outputted based on the stored first data. Therefore, it is not necessary to receive the second data through the second network. Therefore, it is possible to reduce the amount of data received from a network whose communication speed is lower or a network whose communication fee charged according to the amount of communication is higher. Also, it is possible to increase chances that data with a greater amount of data is used to output contents.

An invention described in claim 2 is the terminal device according to claim 1, further comprising: an identification information acquisition means that acquires identification information of either one of the first data and the second data, the identification information being identification information by which a transmitting device identifies data which the transmitting device that transmits data is requested to transmit; and a generation means that generates identification information of the other of the first data and the second data on the basis of the identification information acquired by the identification information acquisition means and a conversion rule between the first data and the second data, wherein the first storage determination means determines whether or not data corresponding to the identification information acquired by the identification information acquisition means and data corresponding to the identification information generated by the generation means are stored in the storage means, the receiving means transmits the identification information acquired by the identification information acquisition means or the identification information generated by the generation means to the transmitting device and thereby receives data identified by the transmitted identification information from the transmitting device, and the control means stores the data received by the receiving means in the storage means in association with the identification information of the received data.

According to this invention, when the identification information of either one of the first data and the second data is acquired, the identification information of the other data can be acquired. Therefore, it is possible to automatically acquire the identification information used to receive data as well as used to determine whether or not the data is stored.

An invention described in claim 3 is the terminal device according to claim 1 or 2, further comprising: a deletion means that deletes the second data corresponding to the first data stored in the storage means by the control means from the storage means.

According to this invention, the second data, which becomes unnecessary to output contents because the first data is stored, is deleted from the storage means. Therefore, it is possible to increase the free storage capacity.

An invention described in claim 4 is the terminal device according to any one of claims 1 to 3, further comprising: a second storage determination means that determines whether or not the first data corresponding to the second data stored in the storage means is stored in the storage means at a predetermined timing, wherein the receiving means receives the first data determined not to be stored by the second storage determination means through the first network when the terminal device is connected to the first network.

According to this invention, contents are outputted based on the second data because the terminal device is not connected to the first network, and thereafter, the first data is received and stored when the terminal device is connected to the first network. Therefore, when the contents are outputted after that, it is possible to output the contents based on the first data which is data having a greater amount of data. Since it is not necessary to receive the first data when the contents should be outputted, it is possible to reduce the time required to output the contents.

An invention described in claim 5 is the terminal device according to any one of claims 1 to 4, wherein when it is determined that the terminal device is connected to the first network and only the second data is stored, the receiving means receives the first data through the first network and the output means outputs contents based on the second data stored in the storage means and thereafter outputs contents based on the first data received by the receiving means.

According to this invention, it is possible to output the contents more quickly by using the stored second data, and thereafter, it is possible to output the contents based on the first data which is data having a greater amount of data.

An invention described in claim 6 is the terminal device according to any one of claims 1 to 4, further comprising: a disconnection determination means that determines whether or not a connection with the first network is disconnected, wherein the output means outputs contents based on the second data when it is determined that the connection with the first network is disconnected while the receiving means is receiving the first data and it is determined that the second data is stored.

According to this invention, it is possible to output the contents even when the first data cannot be received because the connection with the first network is disconnected.

An invention described in claim 7 is the terminal device according to any one of claims 1 to 6, further comprising: a load information acquisition means that acquires load information indicating a load of the first network when it is determined that the first data is not stored and the terminal device is connected to the first network; and a load determination means that determines whether or not the load indicated by the load information is greater than or equal to a predetermined threshold value, wherein when it is determined that the load is greater than or equal to the threshold value, the receiving means receives the second data through the first network and thereafter receives the first data through the first network and the output means outputs contents based on the second data received by the receiving means and thereafter outputs contents based on the first data received by the receiving means.

According to this invention, even when it takes time to receive the first data because the load of the first network is high, it is possible to reduce the time required to output the contents, and thereafter, it is possible to output the contents based on the first data which is data having a greater amount of data.

An invention described in claim 8 is the terminal device according to any one of claims 1 to 7, wherein quality of contents outputted based on the first data is higher than quality of contents outputted based on the second data.

An invention described in claim 9 is a data receiving method by a terminal device that receives data, which is used to output contents, through at least either one of a first network and a second network being at least either one of a network whose communication speed is lower than that of the first network and a network whose communication fee charged according to an amount of communication is higher than that of the first network, the data receiving method comprising: a connection determination step of determining whether or not the terminal device is connected to the first network; a first storage determination step of determining whether or not first data and second data are stored in a storage means, an amount of data of the second data being smaller than that of the first data; a receiving step of receiving the first data through the first network when it is determined that the terminal device is connected to the first network and receiving the second data through the second network when it is determined that the terminal device is not connected to the first network and the first data is not stored in the storage means; a control step of storing data received in the receiving step in the storage means; and an output step of outputting the contents based on the first data when it is determined that the first data is stored in the storage means and outputting the contents based on the second data when it is determined that only the second data is stored in the storage means.

An invention described in claim 10 is a data receiving program that causes a computer, which is included in a terminal device that receives data, which is used to output contents, through at least either one of a first network and a second network being at least either one of a network whose communication speed is lower than that of the first network and a network whose communication fee charged according to an amount of communication is higher than that of the first network, to function as: a connection determination means that determines whether or not the terminal device is connected to the first network; a first storage determination means that determines whether or not first data and second data are stored in a storage means, an amount of data of the second data being smaller than that of the first data; a receiving means that receives the first data through the first network when it is determined that the terminal device is connected to the first network and receives the second data through the second network when it is determined that the terminal device is not connected to the first network and the first data is not stored in the storage means; a control means that stores data received by the receiving means in the storage means; and an output means that outputs the contents based on the first data when it is determined that the first data is stored in the storage means and outputs the contents based on the second data when it is determined that only the second data is stored in the storage means.

An invention described in claim 11 is a recording medium in which a data receiving program is computer-readably recorded, the data receiving program causing a computer, which is included in a terminal device that receives data, which is used to output contents, through at least either one of a first network and a second network being at least either one of a network whose communication speed is lower than that of the first network and a network whose communication fee charged according to an amount of communication is higher than that of the first network, to function as: a connection determination means that determines whether or not the terminal device is connected to the first network; a first storage determination means that determines whether or not first data and second data are stored in a storage means, an amount of data of the second data being smaller than that of the first data; a receiving means that receives the first data through the first network when it is determined that the terminal device is connected to the first network and receives the second data through the second network when it is determined that the terminal device is not connected to the first network and the first data is not stored in the storage means; a control means that stores data received by the receiving means in the storage means; and an output means that outputs the contents based on the first data when it is determined that the first data is stored in the storage means and outputs the contents based on the second data when it is determined that only the second data is stored in the storage means.

Advantageous Effects of Invention

According to the invention, if the first data has already been stored, even if the terminal device is not connected to the first network, contents are outputted based on the stored first data. Therefore, it is not necessary to receive the second data through the second network. Therefore, it is possible to reduce the amount of data received from a network whose communication speed is lower or a network whose communication fee charged according to the amount of communication is higher. Also, it is possible to increase chances that data with a greater amount of data is used to output contents.

DESCRIPTION OF EMBODIMENTS

Hereinafter, embodiments of the present invention will be described in detail with reference to the drawings. The embodiments described below are embodiments where the present invention is applied to a download system.

Figure 1:
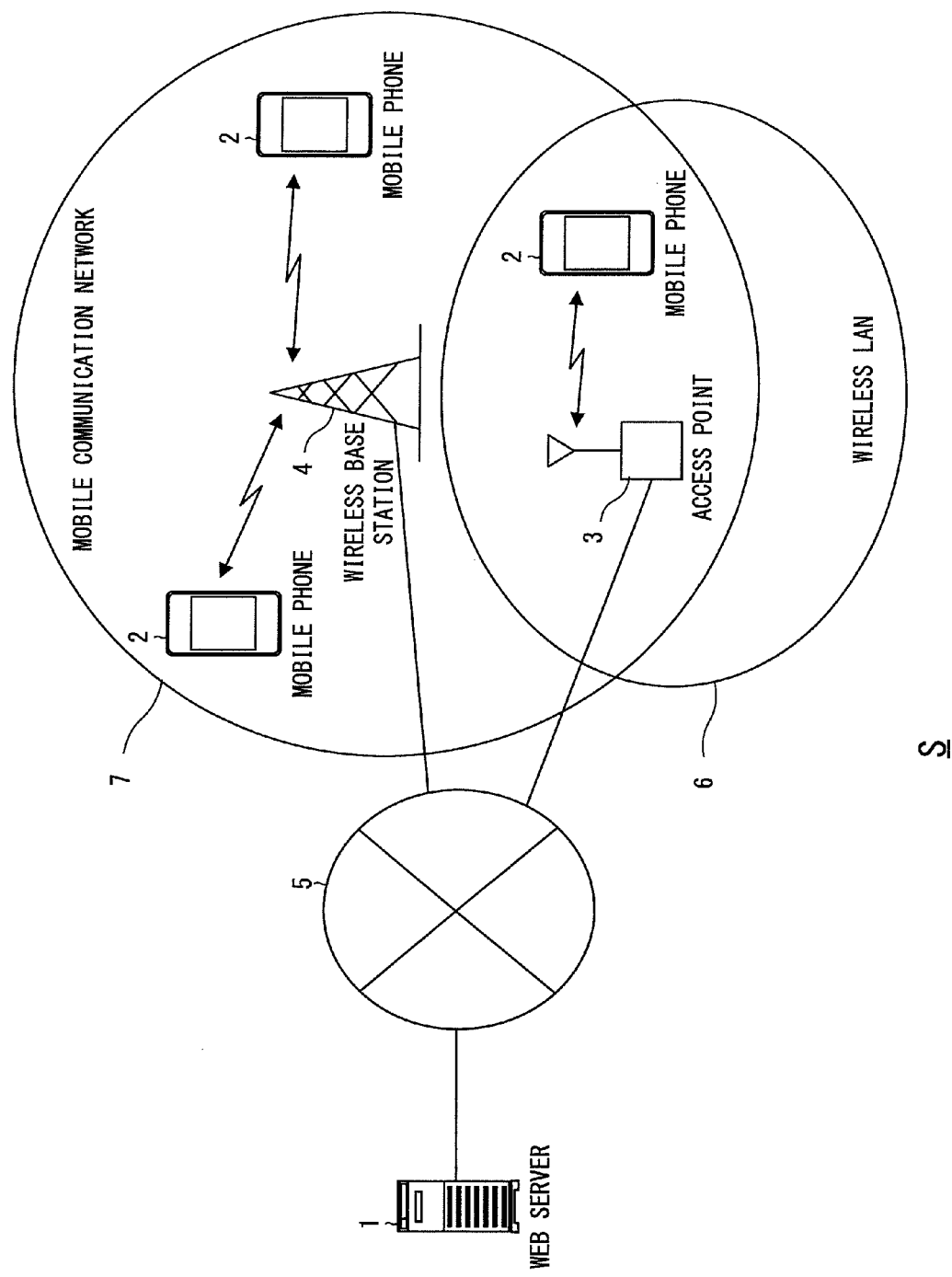
FIG. 1 is a diagram showing an example of a schematic configuration of a download system S according to an embodiment.

1. First Embodiment 1-1. Schematic Configuration and Function of Download System First, schematic configuration and function of a download system S according to the present embodiment will be described with reference to FIG. 1. FIG. 1 is a diagram showing an example of a schematic configuration of the download system S according to the present embodiment.

As shown in FIG. 1, the download system S is configured to include a Web server 1, a plurality of mobile phones 2, an access point 3, and a wireless base station 4.

The Web server 1 is a server device that delivers contents data to the mobile phone 2. The contents data is data for outputting (displaying) contents on a screen and outputting sound. Examples of the contents include an image, a moving image, sound, characters, a Web page, an electronic document, and an RIA (Rich Internet Application). There may be a plurality of Web servers 1. The Web server 1 is an example of a transmitting device of the present invention.

The Web server 1 is connected to a network 5. The network 5 a network to interconnect a plurality of networks. The network 5 includes, for example, Internet exchanges and the like. A plurality of networks is interconnected, so that the Internet is formed.

The access point 3 is a communication device functioning as a base unit that wirelessly communicates with the mobile phone 2 which is a handset of a wireless LAN. The wireless LAN is compliant with at least one of the following standards: IEEE802.11b, IEEE802.11a, IEEE802.11g, IEEE802.11n, and the like. The access point 3 is connected to the network 5 through an access network, a network of an ISP (Internet Service Provider), and the like. The mobile phone 2 communicates with the access point 3, so that the mobile phone 2 connects to a wireless LAN 6. The wireless LAN 6 includes the access point 3 and the mobile phone 2. In the present embodiment, the wireless LAN 6 is described as a network compliant with a standard of wireless LAN. Although FIG. 1 shows only one access point 3, there is a plurality of access points 3 in practice. The wireless LAN 6 is formed for each access point 3. An example of a connection service to the wireless LAN 6 is a public wireless LAN. Also, there is a case in which a user of the mobile phone 2 installs a purchased access point 3 in his or her home. The wireless LAN 6 is an example of a first network of the present invention.

The wireless base station 4 wirelessly communicates with the mobile phone 2 in a mobile communication system. The mobile communication system is, for example, a third generation mobile communication system compliant with IMT-2000 (International Mobile Telecommunication 2000) or a second generation mobile communication system compliant with PDC (Personal Digital Cellular), GSM (Global System for Mobile Communication), or the like. The wireless base station 4 is connected to the network 5 through a core network of a mobile communication provider. The core network includes, for example, a packet switch and the like. Although FIG. 1 shows only one wireless base station 4, there is a plurality of wireless base stations 4 in practice. The mobile phone 2 communicates with the wireless base station 4, so that the mobile phone 2 connects to a mobile communication network 7. The mobile communication network 7 includes a core network and a wireless access network. The wireless access network is a portion in which the wireless base station 4 and the mobile phone 2 wirelessly communicate with each other in the mobile communication network 7. The mobile communication network 7 is an example of a second network of the present invention.

The mobile phone 2 can connect to both networks, the wireless LAN 6 and the mobile communication network 7. The mobile phone 2 may be, for example, a smart phone or a tablet computer. The mobile phone 2 connects to the mobile communication network 7, so that the mobile phone 2 connects to the Web server 1 through the mobile communication network 7 and the network 5. The mobile phone 2 connects to the wireless LAN 6, so that the mobile phone 2 connects to the Web server 1 through the wireless LAN 6 and the network 5. The mobile phone 2 downloads (receives) contents data from the Web server 1 through a connected network by using a communication protocol such as HTTP (HyperText Transfer Protocol). For example, the mobile phone 2 displays contents or outputs sound on the basis of the downloaded contents data. The mobile phone 2 is an example of a terminal device of the present invention.

By the way, when comparing the wireless LAN 6 and the mobile communication network 7, generally, the communication speed of packet communication in the wireless LAN 6 is higher than the communication speed in the mobile communication network 7. For example, the communication speed of IEEE802.11b is 22 Mbps. The communication speed of IEEE802.11a is 54 Mbps. The communication speed of IEEE802.11g is 54 Mbps. The communication speed of IEEE802.11n is 600 Mbps. On the other hand, the communication speed of the mobile communication network 7 is, for example, 7.2 Mbps. These communication speeds are maximum values of the standards or the specifications. The maximum value of the communication speed is an example of a communication speed of the present invention.

In a connection service of the wireless LAN 6 such as the public wireless LAN, the fee system of the packet communication is generally a flat-rate system. For example, a constant packet communication fee is charged to a user for each period regardless of the number of packets transmitted and received in a predetermined period. There is a case in which the packet communication fee is free. When connecting to the wireless LAN 6 by using the access point 3 owned by a user, there is no fee system. The usage fee to connect from a user's home or the like where the access point 3 is installed to the Internet is a flat-rate system. On the other hand, the fee system of the packet communication that uses the mobile communication network 7 is a pay-as-you-go system. For example, the greater the number of packets transmitted and received in a predetermined period, the higher the packet communication fee. The pay-as-you-go system includes a case in which the upper limit of the packet communication fee is set and the packet communication fee does not exceed the upper limit. Also, the pay-as-you-go system includes a case in which a flat rate packet communication fee is charged unless the number of packets exceeds a certain number of packets and a packet communication fee according to the number of packets is charged when the number of packets exceeds the certain number of packets. In the wireless LAN 6 where the fee system is the flat-rate system or the packet communication fee is free, the packet communication fee is not charged depending on the amount of communication. On the other hand, in the mobile communication network 7 where the fee system is the pay-as-you-go system, the packet communication fee is charged according to the amount of communication. Therefore, in the mobile communication network 7, the packet communication fee charged according to the amount of communication is higher than that of the wireless LAN 6.

In this situation, when the mobile phone 2 downloads contents data, it is disadvantageous in both the communication speed and the communication fee for a user to connect to the mobile communication network 7 compared with connecting to the wireless LAN 6. Therefore, when the mobile phone 2 downloads image data which is one of the contents data, the mobile phone 2 downloads different amounts of image data depending on whether the mobile phone 2 is connected to the wireless LAN 6 or the mobile communication network 7. Specifically, the mobile phone 2 downloads high quality image data when the mobile phone 2 is connected to the wireless LAN 6. The mobile phone 2 downloads low quality image data when the mobile phone 2 is connected to the mobile communication network 7. The content of displayed image is the same between the high quality image data and the low quality image data. On the other hand, the quality of the image displayed by the high quality image data is higher than the quality of the image displayed by the low quality image data. Therefore, the amount of data of the high quality image data is greater than that of the low quality image data. For example, the number of pixels (the resolution) of the image displayed by the high quality image data is greater than the number of pixels of the image displayed by the low quality image data. A factor that defines the image quality is not limited to the number of pixels. For example, a bit length of color information assigned to one pixel, lossy/lossless compression of the image, a compression ratio when the image is lossy compressed, and the like may be different between the high quality image data and the low quality image data. The high quality image data is an example of first data of the present invention and the low quality image data is an example of second data of the present invention.

The mobile phone 2 stores the downloaded high quality image data and low quality image data as a cache. When the mobile phone 2 displays an image by the same high quality image data or low quality image data again, the mobile phone 2 displays the image based on the cache of the image data. Thereby, the image data is not received, so that the time elapsed until the image is displayed is further shortened and the packet communication fee is reduced when the mobile phone 2 is connected to the mobile communication network 7.

1-2. Configuration of Web Server

Next, a configuration of the Web server 1 will be described with reference to FIG. 2.

Figure 2:
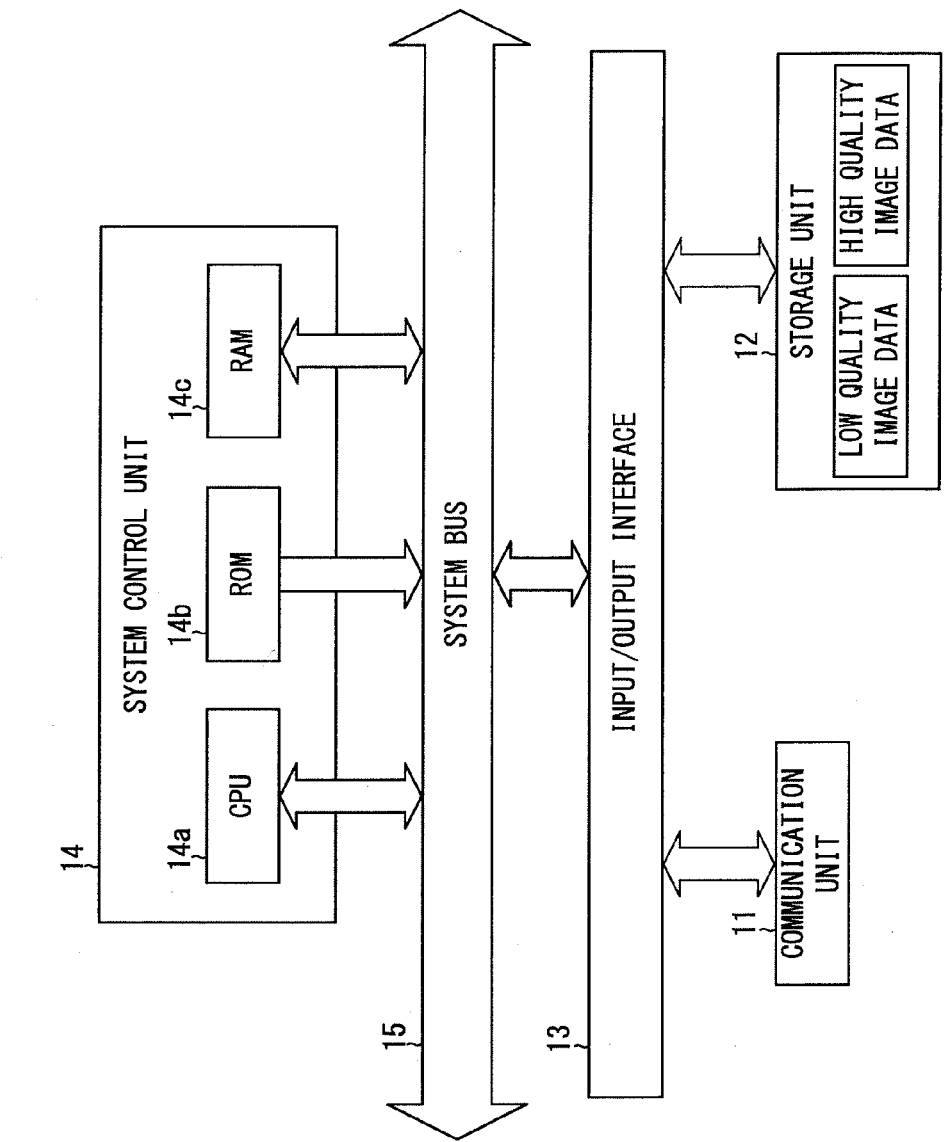
FIG. 2 is a block diagram showing an example of a schematic configuration of a Web server 1 according to an embodiment.

FIG. 2 is a block diagram showing an example of a schematic configuration of the Web server 1 according to the present embodiment. As shown in FIG. 2, the Web server 1 includes a communication unit 11, a storage unit 12, an input/output interface 13, and a system control unit 14. The system control unit 14 and the input/output interface 13 are connected through a system bus 15.

The communication unit 11 connects to the network 5 and controls a communication state with the mobile phone 2 and the like.

The storage unit 12 includes, for example, a hard disk drive and the like. The storage unit 12 stores various programs such as an operating system, a WWW (World Wide Web) server program, and the like.

Also, the storage unit 12 stores various contents data to be delivered to the mobile phones 2. In the storage unit 12, each contents data is individually stored in a predetermined directory.

Also, the storage unit 12 stores the high quality image data and the low quality image data as image data. For example, the high quality image data is generated as image data to display a certain image. Examples of a format of the generated image data include JPEG (Joint Photographic Experts Group), TIFF (Tagged-Image File Format), and PNG (Portable Network Graphics). Also, the low quality image data is generated as image data to display an image having the same display content as that of the above image. For example, the low quality image data is generated so that the number of pixels of the low quality image data is smaller than that of the high quality image data. When the mobile phone 2 actually displays an image, either one of the high quality image data and the low quality image data is used. The high quality image data or the low quality image data may be generated by the Web server 1 or may be generated by a device other than the Web server 1 and stored in the Web server 1.

The high quality image data and the low quality image data which have the same display content of the image are stored in association with each other. For example, the high quality image data and the low quality image data are stored in the same directory. The file name of the high quality image data and the file name of the low quality image data can be inter-converted into each other on the basis of a rule of giving a file name to the high quality image data and the low quality image data. For example, it is assumed that, in the rule of giving a file name to the low quality image data, a file name obtained by adding "_s" to the file name of the high quality image data is defined to be the file name of the low quality image data. In this rule of giving a file name, for example, it is possible to generate a file name "image01_s.jpeg" of the low quality image data from a file name "image01.jpeg" of the high quality image data. On the other hand, in this rule of giving a file name, it is also possible to generate a file name "image01.jpeg" of the high quality image data from a file name "image01_s.jpeg" of the low quality image data. This rule of giving a file name is a conversion rule from a file name of the high quality image data to a file name of the low quality image data.

For example, the domain name of the Web server 1 is "aaaaa.bbb.cc". The high quality image data with a file name of "image01.jpeg" and the low quality image data with a file name of "image01_s.jpeg" are stored in a directory with a directory name of "dddd/eeee". The "dddd/eeee" indicates a relative path from a directory set as a storage position of contents. In this case, the URL (Uniform Resource Locator) of the high quality image data is "http://aaaaa.bbb.cc/dddd/eeee/image01.jpeg". The URL of the low quality image data is "http://aaaaa.bbb.cc/dddd/eeee/image01_s.jpeg". In this way, the URLs of the high quality image data and the low quality image data which have the same display content of the image are associated with each other. The Web server 1 identifies data to be transmitted to the mobile phone 2 by a URL included in an HTTP request (hereinafter referred to as a "request") received from the mobile phone 2. The URL is an example of identification information of the present invention.

The high quality image data and the low quality image data may be stored in directories different from each other, respectively. In this case, the directory names can be interconverted on the basis of a conversion rule of the directory name. The high quality image data and the low quality image data may be respectively stored in Web servers 1 whose domain names are different from each other. In other words, there may be a Web server 1 for delivering only the high quality image data and a Web server 1 for delivering only the low quality image data. In this case, the domain names can be interconverted on the basis of a conversion rule of the domain name. When the directory names or the domain names are different from each other between the high quality image data and the low quality image data, the file names may be the same.

The conversion rule of the file name, the conversion rule of the directory name, and the conversion rule of the domain name are collectively referred to as a "conversion rule of the URL". Information that indicates the conversion rule of the URL may be stored in the storage unit 12 as conversion rule information. The Web server 1 may transmit the conversion rule information to the mobile phone 2 responding to a request from the mobile phone 2. On the basis of one of the URLs of the high quality image data and the low quality image data and the conversion rule information, the mobile phone 2 can generate the other URL.

A plurality of image data may be distributed to and stored in a plurality of Web servers 1 as a unit of the high quality image data and the low quality image data in association with each other. In this case, a rule of giving a URL may be different for each Web server 1.

The input/output interface 13 performs interface processing among the communication unit 11, the storage unit 12, and the system control unit 14.

The system control unit 14 includes a CPU (Central Processing Unit) 14a, a ROM (Read Only Memory) 14b, a RAM (Random Access Memory) 14c, and the like. In the system control unit 14, the CPU 14a executes various programs stored in the storage unit 12 and the ROM 14b, so that the system control unit 14 controls each unit of the Web server 1.

1-3. Configuration of Mobile Phone

Next, a configuration of the mobile phone 2 will be described with reference to FIG. 3.

Figure 3:
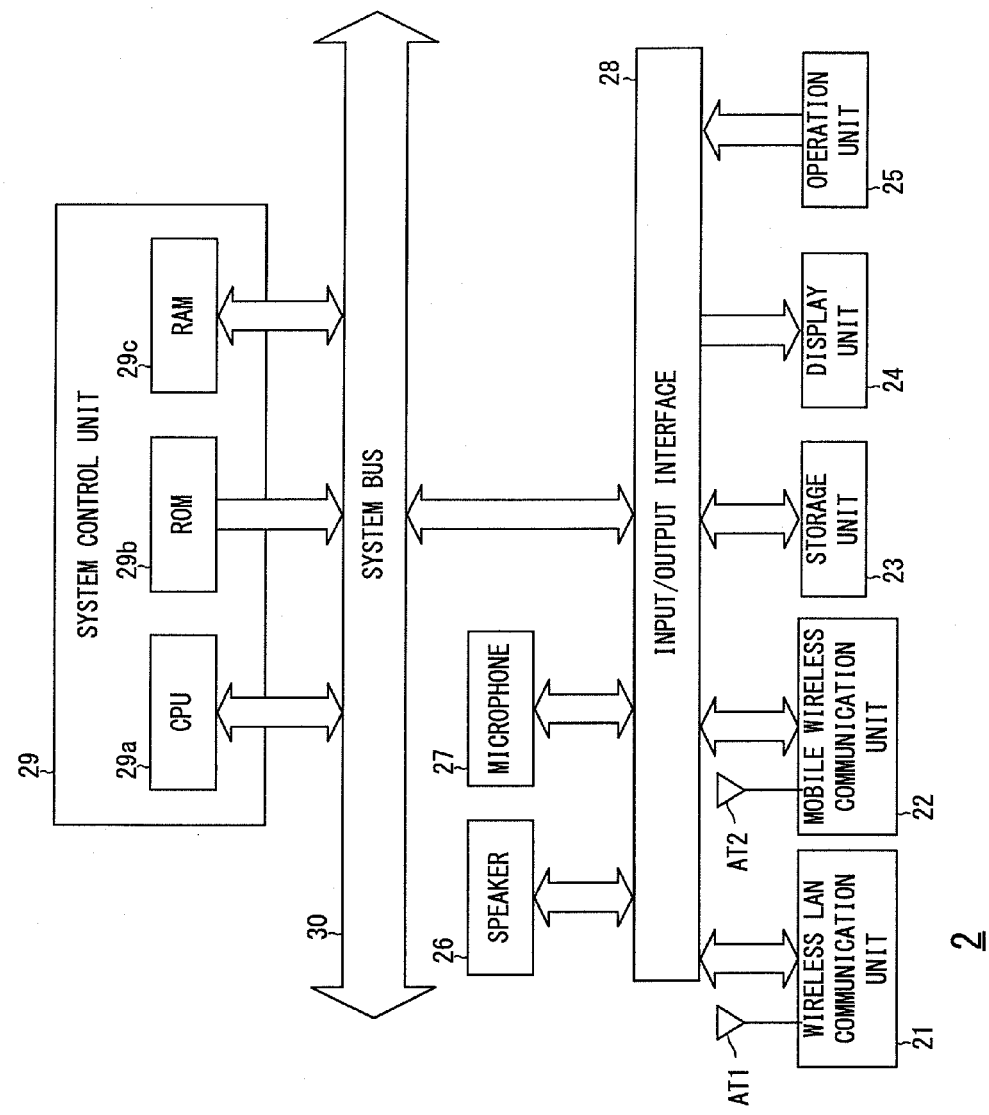
FIG. 3 is a block diagram showing an example of a schematic configuration of a mobile phone 2 according to an embodiment.

FIG. 3 is a block diagram showing an example of a schematic configuration of the mobile phone 2 according to the present embodiment.

As shown in FIG. 3, the mobile phone 2 includes a wireless LAN communication unit 21, a mobile wireless communication unit 22, a storage unit 23, a display unit 24, an operation unit 25, a speaker 26, a microphone 27, an input/output interface 28, and a system control unit 29. The system control unit 29 and the input/output interface 28 are connected through a system bus 30.

The wireless LAN communication unit 21 connects to the wireless LAN 6 and controls communication with the access point 3 by transmitting and receiving radio waves to and from the access point 3 through an antenna AT1. Also, the wireless LAN communication unit 21 transmits packets outputted from the system control unit 29 to the access point 3, receives packets transmitted from the access point 3, and outputs the packets to the system control unit 29. Thereby, the system control unit 29 transmits a request to the Web server 1 through the wireless LAN 6 and receives contents from the Web server 1 through the wireless LAN 6.

The mobile wireless communication unit 22 connects to the mobile communication network 7 and controls communication with the wireless base station 4 by transmitting and receiving radio waves to and from the wireless base station 4 through an antenna AT2. Also, the mobile wireless communication unit 22 transmits packets outputted from the system control unit 29 to the wireless base station 4, receives packets transmitted from the wireless base station 4, and outputs the packets to the system control unit 29. Thereby, the system control unit 29 transmits a request to the Web server 1 through the mobile communication network 7 and receives contents from the Web server 1 through the mobile communication network 7.

When the mobile phone 2 can connect to both the wireless LAN 6 and the mobile communication network 7, the mobile phone 2 is preferentially connected to the wireless LAN 6 by the control of the system control unit 29. In other words, the mobile phone 2 does not connect to both the wireless LAN 6 and the mobile communication network 7 at the same time. The system control unit 29 stores connection information indicating a current connection state and the like of the network into the RAM 29c. When the system control unit 29 wants to refer to the connection state of the network from an application program, the system control unit 29 calls an API (Application Programming Interface) provided by, for example, an operating system. As the connection state of the network, there are a state of connecting with the wireless LAN communication unit 21, a state of connecting with the mobile communication network 7, and a state of not connecting with networks.

The storage unit 23 (an example of a storage means of the present invention) includes, for example, a flash memory and the like. The storage unit 23 stores the operating system. The storage unit 23 also stores various application programs. Here, the storage unit 23 stores a download application. The download application is an application program for downloading data such as, for example, contents searched for by an instruction of a user, contents selected by the user, and contents determined by the system control unit 29 according to an operation of the user from the Web server 1 and displaying contents on the basis of the downloaded data. The data to be downloaded includes the high quality image data, the low quality image data, and the like.

The storage unit 23 stores the high quality image data and the low quality image data, which are downloaded when the system control unit 29 executes the download application, as a cache. Specifically, the high quality image data and the low quality image data are stored in association with a URL of each image data.

The display unit 24 includes, for example, a liquid crystal display and displays information such as characters and images.

The operation unit 25 includes, for example, buttons and a touch panel, receives an operation instruction from a user, and outputs content of the instruction to the system control unit 29 as an instruction signal.

The input/output interface 28 performs interface processing between components from the wireless LAN communication unit 21 to the microphone 27 and the system control unit 29.

The system control unit 29 includes a CPU 29a, a ROM 29b, a RAM 29c, and the like. In the system control unit 29, the CPU 29a reads and executes a program such as the download application stored in the storage unit 23, so that the system control unit 29 functions as a connection determination means, a first storage determination means, a receiving means, an output means, a control means, an identification information acquisition means, a generation means, a deletion means, a second storage determination means, a disconnection determination means, a load information acquisition means, and a load determination means of the present invention.

Specifically, the system control unit 29 acquires the URL of either one of the high quality image data and the low quality image data of an image to be displayed on the display unit 24. In the present embodiment, the URL of the high quality image data is assumed to be acquired. For example, it is assumed that the download application is a program for searching for certain contents. In this case, for example, the system control unit 29 transmits a request to the Web server 1 so that the Web server 1 searches for contents by a search condition inputted by a user. Accordingly, the Web server 1 searches for the contents and transmits, for example, search list information that indicates a list of retrieved contents to the mobile phone 2. URLs of data of the retrieved contents are described in the search list information. The system control unit 29 displays a list of the retrieved contents on the display unit 24 on the basis of the search list information. Here, when the user selects an image from the displayed list, the system control unit 29 acquires the URL of the high quality image data of the selected image from the search list information. Or, for example, it is assumed that a certain Web page is displayed by the download application. In this case, the system control unit 29 downloads an HTML document from the Web server 1. Next, the system control unit 29 displays a Web page on the display unit 24 on the basis of the downloaded HTML document. At this time, when an img tag is described in the HTML document, the system control unit 29 acquires the URL of the high quality image data from a src attribute of the img tag.

When the system control unit 29 acquires the URL of the high quality image data, the system control unit 29 generates the URL of the low quality image data on the basis of the URL of the high quality image data and the conversion rule of the URL. These URLs are used when determining a storage state of the cache and transmitting a request of image data. The conversion rule of the URL may be defined in the download application in advance. Or, the system control unit 29 may acquire the conversion rule of the URL by receiving the conversion rule information from the Web server 1.

The system control unit 29 determines a storage state of the cache of the high quality image data and a storage state of the cache of the low quality image data. The system control unit 29 also determines connection states between the mobile phone 2 and the wireless LAN 6 and between the mobile phone 2 and the mobile communication network 7. The storage states of the caches and the connection states may be determined at different times or at the same time.

On the basis of the determination result of the storage states of the caches and the determination result of the connection states of the networks, the system control unit 29 determines whether the high quality image data or the low quality image data is used as image data used to display an image. Further, on the basis of these determination results, the system control unit 29 determines whether the image data used to display an image is acquired from the storage unit 23, downloaded through the wireless LAN 6, or downloaded through the mobile communication network 7. The system control unit 29 displays an image on the display unit 24 on the basis of the cache of the image data or the downloaded image data.

Specifically, the system control unit 29 uses the cache of the high quality image data to display an image when the cache of the high quality image data is stored in the storage unit 23. Since the image data with higher image quality between the high quality image data and the low quality image data has already been stored, the system control unit 29 can quickly display a high quality image without downloading the image and without increasing the packet communication fee.

Even when the mobile phone 2 is connected to the mobile communication network 7, the cache of the high quality image data is used to display an image. Such a process can be performed by converting the URL. Specifically, when the mobile phone 2 is connected to the mobile communication network 7, it is determined that the low quality image data is downloaded. Therefore, in a conventional application program, a mobile phone acquires a URL of the low quality image data that is data to be downloaded. Then, the mobile phone determines whether or not the cache of data corresponding to the acquired URL is stored. At this time, in the conventional application program, even when the mobile phone has downloaded the high quality image data and stored it as a cache before, the mobile phone cannot display an image by using the cache of the high quality image data. The reason of this is because the cache of data is searched for by the URL of the data that should be downloaded. The URL acquired by the mobile phone is the URL of the low quality image data and the URL of the low quality image data and the URL of the high quality image data are different from each other. Therefore, conventionally, when the cache of the low quality image data is not stored, even if the cache of the high quality image data is stored, the mobile phone cannot help but download the low quality image data. On the other hand, the system control unit 29 uses the cache of the high quality image data to display an image, so that it is possible to increase chances that the image with a higher image quality is displayed.

Next, when the cache of the high quality image data is not stored and the mobile phone 2 is connected to the wireless LAN 6, the system control unit 29 downloads the high quality image data through the wireless LAN 6. Then, the system control unit 29 uses the downloaded high quality image data to display an image. The communication speed of the wireless LAN 6 is faster than that of the mobile communication network 7 and the fee system thereof is the flat-rate system or the packet communication fee thereof is free. Therefore, the system control unit 29 can download the high quality image data in a shorter time than when downloading the high quality image data through the mobile communication network 7. Further, the system control unit 29 can download the high quality image data without increasing the packet communication fee.

Here, the system control unit 29 may acquire information indicating the degree of load of the wireless LAN 6 and when the degree of load of the wireless LAN 6 is greater than or equal to a predetermined threshold value, the system control unit 29 may download the low quality image data instead of the high quality image data through the wireless LAN 6. The system control unit 29 may display an image on the basis of the downloaded low quality image data. When the load of the wireless LAN 6 is high, it takes a long time to download the high quality image data. Therefore, the system control unit 29 downloads the low quality image data whose amount of data is small, so that the time required for the download decreases. Thereby, the system control unit 29 can display an image in a short time.

As a factor to increase the load of the wireless LAN 6, for example, there is a case in which some data is downloaded through the wireless LAN 6 by an application program or the like other than the download application. In this case, the bandwidth of the wireless LAN 6, which can be used to download image data in the download application, is decreased by the download by the other application program or the like. Also, for example, there is a case in which the load of the access point 3 increases and transmission process of image data by the access point 3 is delayed.

As information indicating the degree of load of the wireless LAN 6, there are various examples of information that can be acquired by the system control unit 29. For example, the system control unit 29 may download some data through the wireless LAN 6 before downloading the high quality image data and measure the amount of data downloaded per unit time (hereinafter referred to as "download speed"). For example, the download speed is calculated by the formula below.

Download speed=total number of downloaded packets× size of packet/time required to download the packets Here, it is indicated that the lower the download speed, the smaller the bandwidth that can be used to download, for example, the image data in the download application. Here, as a threshold value of the degree of load, a threshold speed is set in advance. When the system control unit 29 determines that the measured download speed is smaller than or equal to the threshold speed, the degree of load of the wireless LAN 6 is greater than or equal to the threshold value, so that the system control unit 29 downloads the low quality image data through the wireless LAN 6.

An example of data by which the download speed is measured is an HTML document. The reason of this is because when the system control unit 29 displays a Web page including an image on the display unit 24, the system control unit 29 downloads an HTML document of the Web page before downloading image data of the image.

When the system control unit 29 continuously downloads a plurality of image data, the system control unit 29 may measure the download speed of each image data. In this case, the system control unit 29 downloads the first high quality image data and measures the download speed of the first high quality image data, and then the system control unit 29 determines whether the second image data to be downloaded is the high quality image data or the low quality image data on the basis of the measured download speed. Thereafter, the system control unit 29 determines whether the image data to be downloaded next time is the high quality image data or the low quality image data on the basis of the download speed of the image data downloaded just before. The system control unit 29 may perform the above determination not only when continuously downloading a plurality of image data, but also when downloading each image data in an interval of some time.

An example of the information indicating the degree of load of the wireless LAN 6 is a time required from when the system control unit 29 transmits a request of the high quality image data through the wireless LAN 6 to when the system control unit 29 begins to receive a response to the request (hereinafter referred to as "response time"). In this case, the longer the response time, the higher the load of the wireless LAN 6. Here, as a threshold value of the degree of load, a threshold time is set in advance. The system control unit 29 transmits the request of the high quality image data and measures the response time and when the system control unit 29 determines that the measured response time is longer than or equal to the threshold time, the degree of load of the wireless LAN 6 is greater than or equal to the threshold value, so that the system control unit 29 downloads the low quality image data through the wireless LAN 6. In this case, the system control unit 29 cancels the download of the high quality image data.

When the cache of the low quality image data is stored, for example, the system control unit 29 may display an image based on the cache of the low quality image data before the high quality image data is downloaded. After the high quality image data is downloaded, the system control unit 29 may display an image based on the high quality image data. In other words, the system control unit 29 may display a lower quality image and thereafter display a higher quality image. At this time, the system control unit 29 replaces the lower quality image displayed based on the cache of the low quality image data with the higher quality image. Thereby, it is possible to display the image more quickly. Specifically, for example, the system control unit 29 displays an image based on the low quality image data before transmitting the request of the high quality image data or immediately after transmitting the request of the high quality image data.

When the connection with the wireless LAN 6 is disconnected while the system control unit 29 is downloading the high quality image data, the system control unit 29 may display an image based on the cache of the low quality image data. Thereby, even when the download of the high quality image data is failed, the system control unit 29 can display the image.

Next, when only the low quality image data of the high and low quality image data is stored and when the mobile phone 2 is not connected to the wireless LAN 6, that is, when the mobile phone 2 is connected to only the mobile communication network 7 and is not connected to the wireless LAN 6, the system control unit 29 uses the cache of the low quality image data to display an image. In this way, the system control unit 29 can quickly display an image without downloading image data and without increasing the packet communication fee.

Next, when the high quality image data and the low quality image data are not stored and the mobile phone 2 is connected to the mobile communication network 7, the system control unit 29 downloads the low quality image data through the mobile communication network 7. Then, the system control unit 29 uses the downloaded low quality image data to display an image. The amount of data of the low quality image data is smaller than that of the high quality image data. Therefore, the system control unit 29 can complete the download in a shorter time than when downloading the high quality image data. Further, the charged amount of the packet communication fee is smaller than when downloading the high quality image data.

When the system control unit 29 downloads the high quality image data or the low quality image data, the system control unit 29 stores the downloaded image data in the storage unit 23 as a cache. Here, when the system control unit 29 stores the cache of the high quality image data in the storage unit 23, if the cache of the low quality image data associated with the high quality image data is stored in the storage unit 23, the system control unit 29 deletes the cache of the low quality image data from the storage unit 23. When the cache of the high quality image data is stored, it is possible to display a high quality image based on the cache of the high quality image data. Therefore, the low quality image data is not needed. Therefore, the unnecessary low quality image data is deleted from the storage unit 23, so that it is possible to increase the free storage capacity of the storage unit 23.

Since the mobile phone 2 is not connected to the wireless LAN 6, the system control unit 29 cannot download the high quality image data. Therefore, when the system control unit 29 displays an image by the low quality image data, after the mobile phone 2 is connected to the wireless LAN 6, the system control unit 29 downloads the high quality image data. The system control unit 29 stores the downloaded high quality image data in the storage unit 23 as a cache. Such a process is referred to as a high quality image data collection process. An image that has been displayed is more probably redisplayed than an image that has not been displayed, so that the cache of image data that is used to display an image is stored. Here, when the system control unit 29 redisplays an image whose display content is the same as that of an image displayed by using the low quality image data, if the mobile phone 2 is connected to the wireless LAN 6, the system control unit 29 downloads the high quality image data and displays an image. However, if the cache of the high quality image data has already been stored, the system control unit 29 need not download the high quality image data. Therefore, it is possible to display an image in a short time because download is not performed when the image is displayed.

1-4. Operation of Download System

Next, an operation of the download system S will be described with reference to FIGS. 4 to 7.

1-4-1. Image Data Download Process

Figure 4:
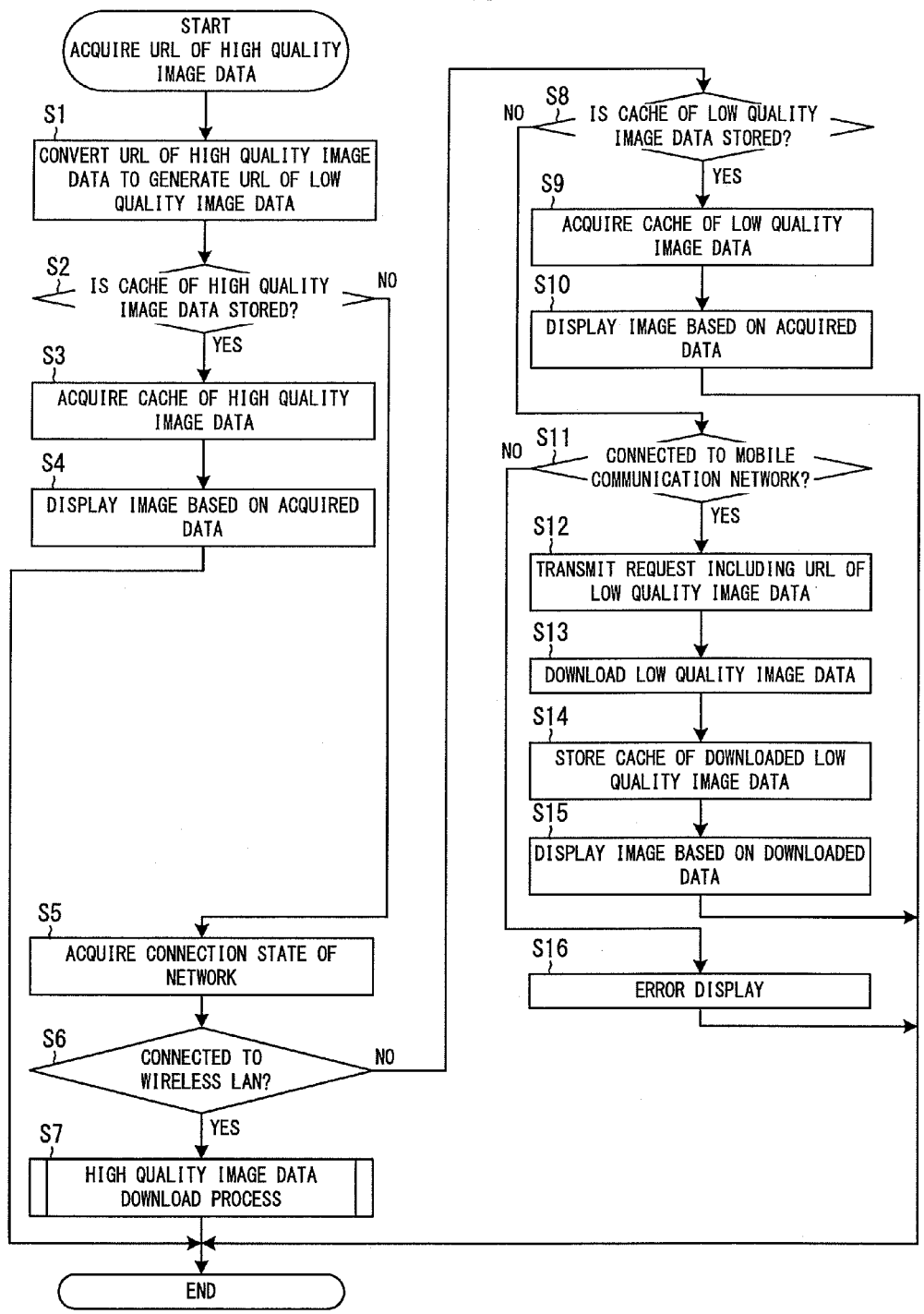
FIG. 4 is a flowchart showing a process example of an image data download process of the system control unit 29 of the mobile phone 2 according to an embodiment.

FIG. 4 is a flowchart showing a process example of an image data download process of the system control unit 29 of the mobile phone 2 according to the present embodiment.

The image data download process is performed every time the system control unit 29 acquires the URL of the high quality image data of an image to be displayed on the display unit 24 while executing the download application. First, the system control unit 29 generates a URL of the low quality image data based on the acquired URL of the high quality image data (step S1). Specifically, the system control unit 29 generates a copy of the URL of the high quality image data. Next, as the generation means, the system control unit 29 converts the copy of the URL of the high quality image data into a URL of the low quality image data on the basis of the conversion rule of the URL.

Next, as the first storage determination means, the system control unit 29 determines whether or not the cache of the high quality image data is stored in the storage unit 23 (step S2). Specifically, the system control unit 29 searches for the cache of the high quality image data from the storage unit 23 by the acquired URL of the high quality image data. The system control unit 29 determines whether or not the cache of the high quality image data is retrieved. In other words, the system control unit 29 determines whether or not the high quality image data associated with the acquired URL is stored in the storage unit 23.

At this time, if the system control unit 29 determines that the cache of the high quality image data is stored (step S2: YES) the system control unit 29 acquires the cache of the high quality image data from the storage unit 23 (step S3). In other words, the system control unit 29 acquires the high quality image data associated with the acquired URL from the storage unit 23. Next, as the output means, the system control unit 29 displays an image on the display unit 24 on the basis of the acquired high quality image data (step S4). Since a method of displaying an image on the basis of image data is known, the detailed description will be omitted. When the system control unit 29 completes the process of step S4, the system control unit 29 ends the image data download process.

In step S2, if the system control unit 29 determines that the cache of the high quality image data is not stored (step S2: NO), the system control unit 29 acquires the connection state of the network (step S5). For example, the system control unit 29 calls an API for acquiring the connection state. Next, as the connection determination means, the system control unit 29 determines whether or not the mobile phone 2 is currently connected to the wireless LAN 6 on the basis of the connection state of the network (step S6).

At this time, if the system control unit 29 determines that the mobile phone 2 is connected to the wireless LAN 6 (step S6: YES), the system control unit 29 performs a high quality image data download process (step S7). In the high quality image data download process, the high quality image data is downloaded through the wireless LAN 6. An image is displayed on the basis of the downloaded high quality image data. The details of the high quality image data download process will be described later. When the system control unit 29 completes the process of step S7, the system control unit 29 ends the image data download process.

In step S6, if the system control unit 29 determines that the mobile phone 2 is not connected to the wireless LAN 6 (step S6: NO), as the first storage determination means, the system control unit 29 determines whether or not the cache of the low quality image data is stored in the storage unit 23 (step S8). Specifically, the system control unit 29 searches for the cache of the low quality image data from the storage unit 23 by the generated URL of the low quality image data. The system control unit 29 determines whether or not the cache of the low quality image data is retrieved. In other words, the system control unit 29 determines whether or not the low quality image data associated with the generated URL is stored in the storage unit 23.

At this time, if the system control unit 29 determines that the cache of the low quality image data is stored (step S8: YES), the system control unit 29 acquires the cache of the low quality image data from the storage unit 23 (step S9). In other words, the system control unit 29 acquires the low quality image data associated with the generated URL from the storage unit 23. Next, as the output means, the system control unit 29 displays an image on the display unit 24 on the basis of the acquired low quality image data (step S10). When the system control unit 29 completes the process of step S10, the system control unit 29 ends the image data download process.

In step S8, if the system control unit 29 determines that the cache of the low quality image data is not stored (step S8: NO), the system control unit 29 determines whether or not the mobile phone 2 is currently connected to the mobile communication network 7 on the basis of the connection state of the network (step S11).

At this time, if the system control unit 29 determines that the mobile phone 2 is connected to the mobile communication network 7 (step S11: YES), the system control unit 29 downloads the low quality image data through the mobile communication network 7. Specifically, the system control unit 29 transmits a request including the generated URL of the low quality image data through the mobile wireless communication unit 22 (step S12). When the Web server 1 receives the request, the Web server 1 acquires the low quality image data corresponding to the URL included in the request from the storage unit 12. Then, the Web server 1 transmits the acquired low quality image data. As the receiving means, the system control unit 29 downloads the low quality image data transmitted from the Web server 1 through the mobile wireless communication unit 22 (step S13). Next, as the control means, the system control unit 29 stores the downloaded low quality image data in the storage unit 23 as a cache in association with the generated URL of the low quality image data (step S14). Next, the system control unit 29 displays an image on the display unit 24 on the basis of the downloaded low quality image data (step S15). When the system control unit 29 completes the process of step S15, the system control unit 29 ends the image data download process.

In step S11, if the system control unit 29 determines that the mobile phone 2 is not connected to the mobile communication network 7 (step S11: NO), the system control unit 29 displays an error message on the display unit 24 (step S16). This is because the cache of the image data of the image to be displayed is not stored and the image data cannot be downloaded. When the system control unit 29 completes the process of step S16, the system control unit 29 ends the image data download process.

1-4-2. High Quality Image Data Download Process

EXAMPLE 1

Figure 5:
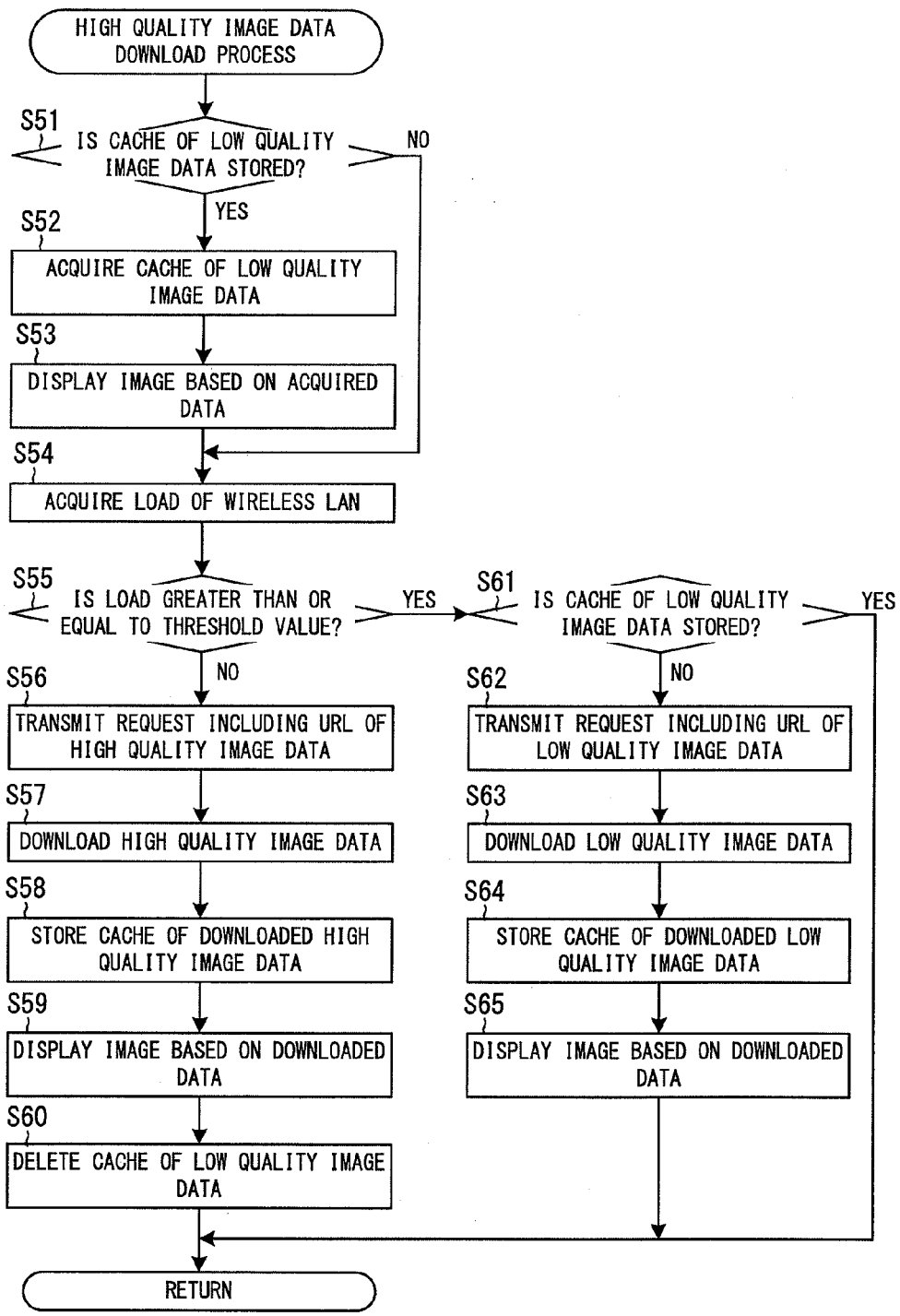
FIG. 5 is a flowchart showing a process example of a high quality image data download process of an example by the system control unit 29 of the mobile phone 2 according to an embodiment.

FIG. 5 is a flowchart showing a process example of a high quality image data download process of an example 1 by the system control unit 29 of the mobile phone 2 according to the present embodiment.

In the example 1, when the cache of the low quality image data is stored, first, an image is displayed on the basis of the low quality image data. When the download of the high quality image data is completed, an image is displayed on the basis of the high quality image data.

First, the system control unit 29 determines whether or not the cache of the low quality image data is stored in the storage unit 23 (step S51). At this time, if the system control unit 29 determines that the cache of the low quality image data is stored (step S51: YES), the system control unit 29 acquires the cache of the low quality image data from the storage unit 23 (step S52). Next, the system control unit 29 displays an image on the display unit 24 on the basis of the acquired low quality image data (step S53). Specific content of the process of steps S51 to S53 is the same as that of steps S8 to S10 in the image data download process.

When the system control unit 29 determines that the cache of the low quality image data is not stored (step S51: NO) or when the system control unit 29 completes the process of step S53, as the load information acquisition means, the system control unit 29 acquires the information indicating the degree of load of the wireless LAN 6 (step S54). In the description below, as the information indicating the degree of load, the download speed is used. In this case, the system control unit 29 acquires the download speed of data downloaded just before. For example, the latest measured download speed is stored in a predetermined area in the RAM 29c. Therefore, the system control unit 29 acquires the download speed from the RAM 29c.

Next, as the load determination means, the system control unit 29 determines whether or not the degree of load indicated by the acquired information is greater than or equal to the threshold value stored in the storage unit 23 (step S55). At this time, if the system control unit 29 determines that the acquired download speed is not smaller than or equal to the threshold speed, that is, if the system control unit 29 determines that the degree of load is not greater than or equal to the threshold value (step S55: NO), the system control unit 29 downloads the high quality image data through the wireless LAN 6. Specifically, the system control unit 29 transmits a request including the acquired URL of the high quality image data through the wireless LAN communication unit 21 (step S56). As the receiving means, the system control unit 29 downloads the high quality image data transmitted from the Web server 1 through the wireless LAN communication unit 21 (step S57). If the download speed of the high quality image data is used in the determination in step S55, the system control unit 29 measures the download speed at this time. The system control unit 29 stores the measured download speed in the RAM 29c.

Next, as the control means, the system control unit 29 stores the downloaded high quality image data in the storage unit 23 as a cache in association with the acquired URL of the high quality image data (step S58). Next, as the output means, the system control unit 29 displays an image on the display unit 24 on the basis of the downloaded high quality image data (step S59). At this time, the system control unit 29 displays a new image over the image displayed based on the low quality image data. In other words, the system control unit 29 replaces the lower quality image displayed on the screen with the higher quality image.

Next, as the deletion means, the system control unit 29 deletes the cache of the low quality image data from the storage unit 23 (step S60). Specifically, the system control unit 29 determines whether or not the low quality image data associated with the generated URL is stored in the storage unit 23. If the low quality image data is stored in the storage unit 23, the system control unit 29 deletes the low quality image data. When the system control unit 29 completes the process of step S60, the system control unit 29 ends the high quality image data download process.

In step S55, if the system control unit 29 determines that the acquired download speed is smaller than or equal to the threshold speed, that is, if the system control unit 29 determines that the degree of load is greater than or equal to the threshold value (step S55: YES), the system control unit 29 determines whether or not the cache of the low quality image data is stored in the storage unit 23 (step S61). This determination method is the same as that of step S8 in the image data download process.

At this time, if the system control unit 29 determines that the cache of the low quality image data is not stored (step S61: NO), the system control unit 29 downloads the low quality image data through the wireless LAN 6. Specifically, the system control unit 29 transmits a request including the generated URL of the low quality image data through the wireless LAN communication unit 21 (step S62). Then, the system control unit 29 downloads the low quality image data transmitted from the Web server 1 through the wireless LAN communication unit 21 (step S63). Next, the system control unit 29 stores the downloaded low quality image data in the storage unit 23 as a cache in association with the generated URL of the low quality image data (step S64). Next, the system control unit 29 displays an image on the display unit 24 on the basis of the downloaded low quality image data (step S65). When the system control unit 29 completes the process of step S65, the system control unit 29 ends the high quality image data download process.

In step S61, if the system control unit 29 determines that the cache of the low quality image data is stored (step S61: YES), the system control unit 29 ends the high quality image data download process. In this case, in step S53, an image is displayed on the basis of the cache of the low quality image data.

EXAMPLE 2

Figure 6:
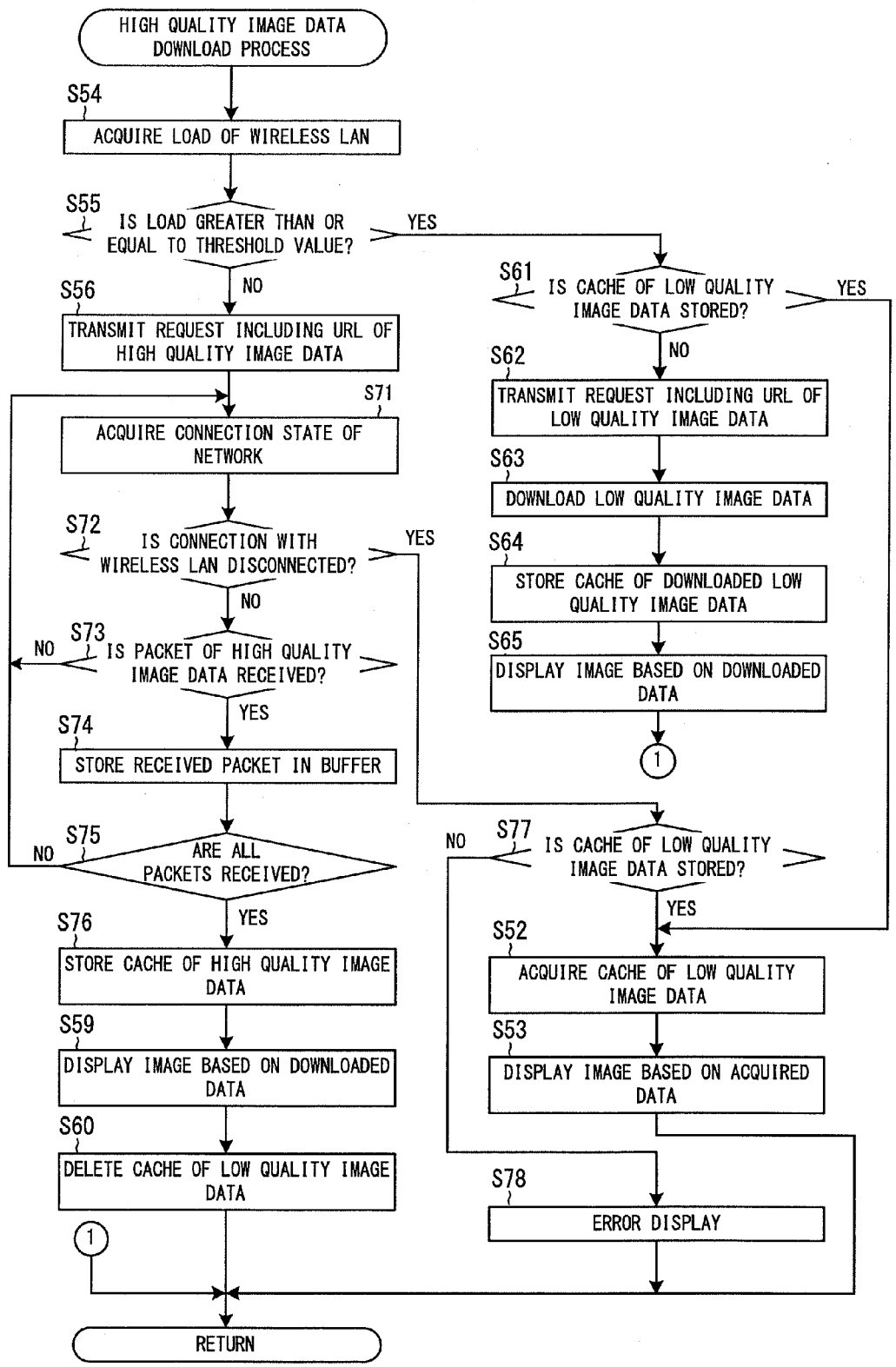
FIG. 6 is a flowchart showing a process example of a high quality image data download process of an example by the system control unit 29 of the mobile phone 2 according to an embodiment.

FIG. 6 is a flowchart showing a process example of a high quality image data download process of an example 2 by the system control unit 29 of the mobile phone 2 according to the present embodiment. In FIG. 6, the same steps as those in FIG. 5 are denoted by the same step numbers.

In the example 2, when the connection with the wireless LAN 6 is disconnected while the high quality image data is being downloaded, if the cache of the low quality image data is stored, an image is displayed on the basis of the low quality image data.

First, the system control unit 29 acquires information indicating the degree of load of the wireless LAN 6 (step S54) and determines whether or not the degree of load is greater than or equal to the threshold value (step S55). At this time, if the system control unit 29 determines that the degree of load is greater than or equal to the threshold value (step S55: YES), the system control unit 29 determines whether or not the cache of the low quality image data is stored in the storage unit 23 (step S61).

At this time, if the system control unit 29 determines that the cache of the low quality image data is not stored (step S61: NO), the system control unit 29 performs the processes from step S61 to step S65 and ends the high quality image data download process. On the other hand, if the system control unit 29 determines that the cache of the low quality image data is stored (step S61: YES), the system control unit 29 acquires the cache of the low quality image data from the storage unit 23 (step S52) and displays an image on the display unit 24 on the basis of the acquired low quality image data (step S53). When the system control unit 29 completes the process of step S53, the system control unit 29 ends the high quality image data download process.

In step S55, if the system control unit 29 determines that the degree of load is not greater than or equal to the threshold value (step S55: NO), the system control unit 29 downloads the high quality image data through the wireless LAN 6. Specifically, the system control unit 29 transmits a request including the acquired URL of the high quality image data through the wireless LAN communication unit 21 (step S56).

Then, the system control unit 29 downloads the high quality image data transmitted from the Web server 1 through the wireless LAN communication unit 21. Steps S71 to S76 show in detail the content of the process to download the high quality image data.

First, the system control unit 29 acquires the connection state of the network (step S71). Next, as the disconnection determination means, the system control unit 29 determines whether or not the connection with the wireless LAN 6 is disconnected on the basis of the connection state of the network (step S72). When the connection state of the network indicates the state of connecting with the mobile communication network 7 or the state of not connecting with networks, the connection with the wireless LAN 6 is disconnected.

At this time, if the system control unit 29 determines that the connection with the wireless LAN 6 is not disconnected (step S72: NO), the system control unit 29 determines whether or not a packet of response including the high quality image data is received from the Web server 1 through the wireless LAN communication unit 21 (step S73). At this time, if the system control unit 29 determines that the packet of response is not received (step S73: NO), the system control unit 29 proceeds to step S71. On the other hand, if the system control unit 29 determines that the packet of response is received (step S73: YES), the system control unit 29 stores the received packet in a buffer (step S74). The buffer is provided in a storage area in the RAM 29c to temporarily accumulate the received packet.

First, the system control unit 29 determines whether or not all packets that form a response including the high quality image data are received (step S75). At this time, if the system control unit 29 determines that there is a packet that has not yet been received (step S75: NO), the system control unit 29 proceeds to step S71. The system control unit 29 repeats the processes from step S71 to step S75, so that the system control unit 29 stores the packets transmitted from the Web server 1 in the buffer and reconstructs the response including the high quality image data. When the system control unit 29 determines that all the packets are received (step S75: YES), the system control unit 29 associates the high quality image data included in the response stored in the buffer with the acquired URL of the high quality image data and stores the high quality image data in the storage unit 23 as a cache (step S76). Next, the system control unit 29 displays an image on the display unit 24 on the basis of the high quality image data stored from the buffer into the storage unit 23 (step S59). Next, the system control unit 29 deletes the cache of the low quality image data from the storage unit 23 (step S60). When the system control unit 29 completes the process of step S60, the system control unit 29 ends the high quality image data download process.

In step S72, if the system control unit 29 determines that the connection with the wireless LAN 6 is disconnected (step S72: YES), the system control unit 29 determines whether or not the cache of the low quality image data is stored in the storage unit 23 (step S77). This determination method is the same as that of step S8 in the image data download process. At this time, if the system control unit 29 determines that the cache of the low quality image data is stored in the storage unit 23 (step S77: YES), the system control unit 29 acquires the cache of the low quality image data from the storage unit 23 (step S52) and displays an image on the display unit 24 on the basis of the acquired low quality image data (step S53).

On the other hand, if the system control unit 29 determines that the cache of the low quality image data is not stored in the storage unit 23 (step S77: NO), the system control unit 29 displays an error message on the display unit 24 (step S78). When the cache of the low quality image data is not stored, the system control unit 29 may download the low quality image data through the wireless LAN 6 and display an image based on the downloaded low quality image data (step S61 to step S65). When the system control unit 29 completes the process of step S53 or step S78, the system control unit 29 ends the high quality image data download process.

1-4-3. High Quality Image Data Collection Process

Figure 7:
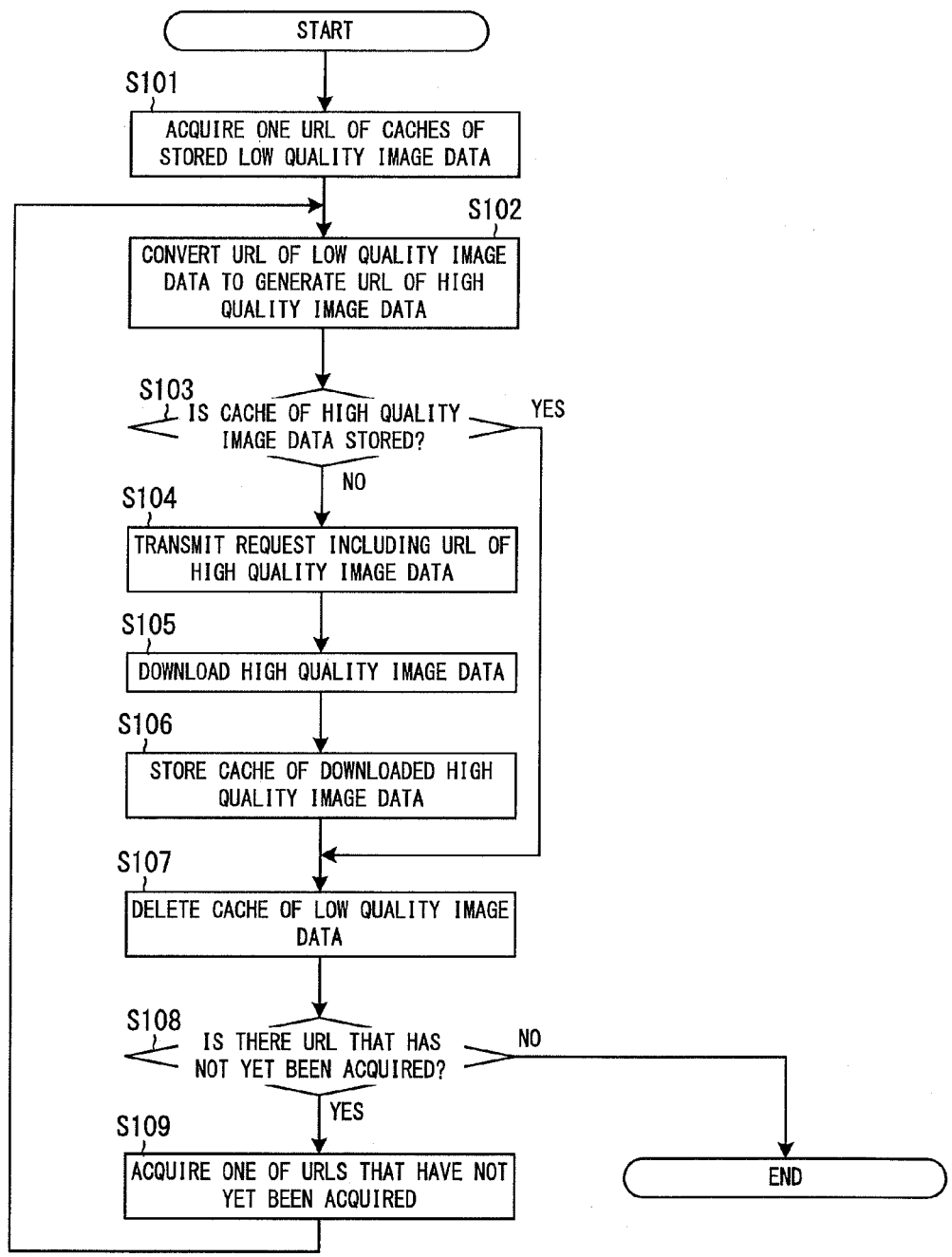
FIG. 7 is a flowchart showing a process example of a high quality image data collection process of the system control unit 29 of the mobile phone 2 according to an embodiment.

FIG. 7 is a flowchart showing a process example of a high quality image data collection process of the system control unit 29 of the mobile phone 2 according to the present embodiment.

The high quality image data collection process is performed at a predetermined timing while the mobile phone 2 is connected to the wireless LAN 6. The timing at which the high quality image data collection process is performed is determined by, for example, the download application. For example, when the mobile phone 2 is connected to the wireless LAN 6, the system control unit 29 may call the download application by interrupt handling. The system control unit 29 may perform the high quality image data collection process when the download application is invoked. Also, for example, when the system control unit 29 activates the download application, the system control unit 29 may determine whether or not the mobile phone 2 is connected to the wireless LAN 6. When the system control unit 29 determines that the mobile phone 2 is connected to the wireless LAN 6, the system control unit 29 may perform the high quality image data collection process. For example, even after the screen of the download application is closed by an operation of a user, the process of the download application may be resident as a background process. The system control unit 29 regularly determines whether or not the mobile phone 2 is connected to the wireless LAN 6 in the background process, and when the system control unit 29 determines that the mobile phone 2 is connected to the wireless LAN 6, the system control unit 29 may perform the high quality image data collection process.

In the high quality image data collection process, the system control unit 29 enumerates the caches of the low quality image data stored in the storage unit 23. Then, the system control unit 29 generates a list of URLs associated with the enumerated low quality image data. Next, the system control unit 29 acquires one URL from the generated list (step S101). Next, the system control unit 29 generates a URL of the high quality image data based on the acquired URL of the low quality image data (step S102). Specifically, the system control unit 29 generates a copy of the URL of the low quality image data. Next, the system control unit 29 converts the copy of the URL of the low quality image data into a URL of the high quality image data on the basis of the conversion rule of the URL.

Next, as the second storage determination means, the system control unit 29 determines whether or not the cache of the high quality image data associated with the generated URL is stored in the storage unit 23 (step S103). At this time, if the system control unit 29 determines that the cache of the high quality image data is not stored (step S103: NO), the system control unit 29 transmits a request including the acquired URL of the high quality image data through the wireless LAN communication unit 21 (step S104). As the receiving means, the system control unit 29 downloads the high quality image data through the wireless LAN communication unit 21 (step S105). Next, the system control unit 29 stores the downloaded high quality image data in the storage unit 23 as a cache (step S106). Next, the system control unit 29 deletes the cache of the low quality image data from the storage unit 23 (step S107). These processes are the same as the processes of the steps S56 to S58 in the high quality image data download process.

In step S103, if the system control unit 29 determines that the cache of the high quality image data is stored (step S103: YES), the system control unit 29 deletes the cache of the low quality image data from the storage unit 23 (step S107).

When the system control unit 29 completes the process of step S107, the system, control unit 29 determines whether or not there are URLs that have not yet been acquired from the list (step S108). At this time, if the system control unit 29 determines that there are one or more URLs that have not yet been acquired (step S108: YES), the system control unit 29 acquires one of the URLs that have not yet been acquired from the list (step S109). Next, the system control unit 29 proceeds to step S102. The system control unit 29 repeats the processes from step S102 to step S109, so that the system control unit 29 downloads the high quality image data that are not stored as a cache from among the high quality image data associated with the caches of the low quality image data stored in the storage unit 23. If the system control unit 29 determines that there is no URL that has not yet been acquired from the list (step S108: NO), the system control unit 29 ends the high quality image data collection process.

Before the mobile phone 2 is connected to the wireless LAN 6, the system control unit 29 may enumerate in advance the high quality image data that are not stored as a cache from among the high quality image data associated with the caches of the low quality image data stored in the storage unit 23. After the mobile phone 2 is connected to the wireless LAN 6, the system control unit 29 may download the image data that have been enumerated in advance.

As described above, according to the present embodiment, the system control unit 29 determines whether or not the high quality image data is stored in the storage unit 23, whether or not the low quality image data is stored in the storage unit 23, and whether or not the mobile phone 2 is connected to the wireless LAN 6, and when it is determined that the mobile phone 2 is connected to the wireless LAN 6, the system control unit 29 downloads the high quality image data through the wireless LAN 6, when the mobile phone 2 is not connected to the wireless LAN 6 and the high quality image data is not stored in the storage unit 23, the system control unit 29 downloads the low quality image data through the mobile communication network 7 and stores the downloaded image data in the storage unit 23, when the high quality image data is stored in the storage unit 23, the system control unit 29 displays an image on the basis of the stored high quality image data, and when only the low quality image data is stored in the storage unit 23, the system control unit 29 displays an image on the basis of the stored low quality image data.

Therefore, when the high quality image data has already been stored, even if the mobile phone 2 is not connected to the wireless LAN 6, an image is displayed on the basis of the stored high quality image data. Therefore, it is not necessary to receive the low quality image data through the mobile communication network 7. Therefore, it is possible to reduce the amount of data received from the mobile communication network 7. Also, it is possible to increase the chances that a higher quality image is displayed by the high quality image data.

The system control unit 29 acquires the URL of the high quality image data of an image to be displayed and generates the URL of the low quality image data on the basis of the acquired URL and the conversion rule of the URL.

Therefore, it is possible to automatically acquire the URL which is used to download the high quality image data and the low quality image data as well as used to determine whether the high quality image data and the low quality image data are stored.

The system control unit 29 deletes the low quality image data associated with the high quality image data stored in the storage unit 23.

Therefore, the unnecessary low quality image data is deleted from the storage unit 23, so that it is possible to increase the free storage capacity.

The system control unit 29 determines whether or not the high quality image data associated with the low quality image data stored in the storage unit 23 is stored in the storage unit 23 at a predetermined timing, downloads the high quality image data that is determined not to be stored through the wireless LAN 6 when the mobile phone 2 is connected to the wireless LAN 6, and stores the downloaded high quality image data in the storage unit 23.

Therefore, when an image is redisplayed after the image is displayed on the basis of the low quality image data because the mobile phone 2 is not connected to the wireless LAN 6, it is possible to display the image on the basis of the high quality image data that is data having a greater amount of data. Since it is not necessary to download the high quality image data when the image should be displayed, it is possible to reduce the time required to display the image.

When the system control unit 29 determines that the mobile phone 2 is connected to the wireless LAN 6 and further determines that only the low quality image data is stored, the system control unit 29 displays an image on the basis of the low quality image data stored in the storage unit 23 before downloading the high quality image data, downloads the high quality image data through the wireless LAN 6, and displays an image on the basis of the downloaded high quality image data.

Therefore, it is possible to more quickly display the image, and thereafter, the higher quality image can be displayed.

The system control unit 29 determines whether or not the connection with the wireless LAN 6 is disconnected, and when the connection with the wireless LAN 6 is determined to be disconnected while the high quality image data is being received and the low quality image data is determined to be stored, the system control unit 29 displays an image on the basis of the low quality image data stored in the storage unit 23.

Therefore, even when the high quality image data cannot be downloaded because the connection with the wireless LAN 6 is disconnected, the image can be displayed.

When the system control unit 29 determines that the mobile phone 2 is connected to the wireless LAN 6 and further determines that the high quality image data is not stored, the system control unit 29 acquires information indicating the degree of load of the wireless LAN 6 and determines whether or not the degree of load is greater than or equal to the threshold value, and when the degree of load is determined to be greater than or equal to the threshold value, the system control unit 29 downloads the low quality image data through the wireless LAN 6 and displays an image based on the downloaded low quality image data.

Therefore, even when it takes time to download the high quality image data because the load of the wireless LAN 6 is high, it is possible to reduce the time required to display the image.

Here, when the system control unit 29 determines that the degree of load of the wireless LAN 6 is greater than or equal to the threshold value, the system control unit 29 may download the high quality image data through the wireless LAN 6 after completing the download of the low quality image data through the wireless LAN 6. The system control unit 29 first may display an image on the basis of the downloaded low quality image data, and then display an image on the basis of the downloaded high quality image data. In other words, while downloading the high quality image data, the system control unit 29 displays the lower quality image. When the download of the high quality image data is completed, the system control unit 29 replaces the displayed lower quality image with the higher quality image. In this case, even when it takes time to download the high quality image data, it is possible to quickly display the image, and thereafter, the higher quality image can be displayed.

In the present embodiment, the mobile phone 2 connects to either one of the wireless LAN 6 and the mobile communication network 7 at one time point. However, the mobile phone 2 may connect to both the wireless LAN 6 and the mobile communication network 7 at the same time. In this case, when the mobile phone 2 is connected to both the wireless LAN 6 and the mobile communication network 7, the system control unit 29 determines that the mobile phone 2 is connected to the wireless LAN 6. In other words, the system control unit 29 prioritizes downloading the high quality image data through the wireless LAN 6 over downloading the low quality image data through the mobile communication network 7.

In the present embodiment, the system control unit 29 determines whether or not the mobile phone 2 is connected to the wireless LAN 6 and whether or not the mobile phone 2 is connected to the mobile communication network 7. However, the system control unit 29 need not determine whether or not the mobile phone 2 is connected to the mobile communication network 7 in the download application. When any of the cache of the high quality image data and the cache of the low quality image data is not stored in the storage unit 23 and the mobile phone 2 is not connected to the wireless LAN 6, the system control unit 29 needs to download the low quality image data through the mobile communication network 7. At this time, when the mobile phone 2 is not connected to the mobile communication network 7, the system control unit 29 cannot download the low quality image data regardless of whether or not the system control unit 29 determines whether or not the mobile phone 2 is connected to the mobile communication network 7. In other words, regardless of whether or not the system control unit 29 performs the determination, the processing result after that does not change. However, the time required to display an error message may change. In case where the mobile phone 2 is not connected to the mobile communication network 7, for example, when the system control unit 29 tries to transmit a request and detects that the transmission is failed or when the system control unit 29 does not receive a response from the Web server 1 even after a certain time has elapsed from the transmission of the request, the system control unit 29 displays an error message.

2. Second Embodiment

In the description of the first embodiment, the communication speed of the wireless LAN 6 is higher than that of the mobile communication network 7. Also in the description of the first embodiment, the fee system of the wireless LAN 6 is the flat-rate system or the packet communication fee is free and the fee system of the mobile communication network 7 is the pay-as-you-go system. However, in practice, the communication speed of the wireless LAN 6 may be lower than that of the mobile communication network 7. For example, the communication speed of the mobile communication network 7 may be increased due to specification change or the like. Or, for example, the communication speed may be limited by the access point 3. For example, there may be a case in which the link speed is lower than the maximum value of the communication speed of the specification depending on the communication state between the access point 3 and the mobile phone 2 even when using the same access point 3. The link speed is the maximum communication speed when the access point 3 and the mobile phone 2 actually communicate with each other. There is a case in which the user can select the pay-as-you-go system as the fee system of the wireless LAN 6 and the user can select the flat-rate system as the fee system of the mobile communication network 7.

Therefore, in the second embodiment, the mobile phone 2 does not perform processing based on whether the connected network is the wireless LAN 6 or the mobile communication network 7. The mobile phone 2 determines whether the communication speed of the connected network is high speed or low speed and further determines whether the fee system of the connected network is the flat-rate system, the pay-as-you-go system, or free.

Specifically, the system control unit 29 determines whether or not the communication speed is the high speed on the basis of a predetermined reference speed. Specifically, when the system control unit 29 determines that the communication speed of the connected network is higher than or equal to the reference speed, the system control unit 29 determines that the communication speed is the high speed. On the other hand, when the system control unit 29 determines that the communication speed of the connected network is lower than the reference speed, the system control unit 29 determines that the communication speed is the low speed. The reference speed may be set in the download application in advance. Or, the reference speed may be set by the user and stored in the storage unit 23.

The communication speed of the network may be stored in, for example, the storage unit 23 in advance. For example, the communication speed of the mobile communication network 7 is stored in the storage unit 23. The communication speed of the wireless LAN 6 is stored in the storage unit 23 for each SSID (Service Set Identifier) of the access point 3. For example, when the mobile phone 2 connects to the wireless LAN 6, the access point 3 transmits the set link speed to the mobile phone 2. Therefore, the system control unit 29 may store connection information into the RAM 29c. The connection information includes the link speed of the connected wireless LAN 6, the SSID of the access point 3 of the connected wireless LAN 6, and the connection state of the network.

For example, information indicating the fee system of the network may be stored in the storage unit 23 in advance as fee system information. For example, the fee system information of the mobile communication network 7 is stored and the fee system information of the wireless LAN 6 is stored for each SSID. The fee system information indicates one of the flat-rate system, the pay-as-you-go system, and free.

The system control unit 29 performs processing based on the determination result of the communication speed and the fee system of the connected network.

Specifically, the system control unit 29 uses the cache of the high quality image data to display an image when the cache of the high quality image data is stored in the storage unit 23. This is the same as in the first embodiment.

Next, when the cache of the high quality image data is not stored and the fee system of the connected network is the pay-as-you-go system, the system control unit 29 uses the low quality image data to display an image. This process is performed even when the communication speed of the connected network is the high speed. This is because even if the time required to download the high quality image data is shortened by using a network whose communication speed is high, the amount of data is large and the packet communication fee of the data is charged to the user. Here, when the cache of the low quality image data is stored, the system control unit 29 uses the cache of the low quality image data to display an image, and when the cache of the low quality image data is not stored, the system control unit 29 downloads the low quality image data used to display an image.

Next, when the cache of the high quality image data is not stored, the fee system of the connected network is the flat-rate system, and the communication speed of the connected network is the low speed, the system control unit 29 uses the low quality image data to display an image. This is because if the high quality image data is downloaded, the time required for the download increases even though no packet communication fee is charged.

Next, when the cache of the high quality image data is not stored, the fee system of the connected network is the flat-rate system, and the communication speed of the connected network is the high speed, the system control unit 29 downloads the high quality image data. Then, the system control unit 29 uses the downloaded high quality image data to display an image.

In the present embodiment, a network where the communication speed is the high speed and the fee system is the flat-rate system or the communication fee is free is an example of the first network of the present invention. A network where the communication speed is the low speed or the fee system is the pay-as-you-go system is an example of the second network of the present invention.

Figure 8:
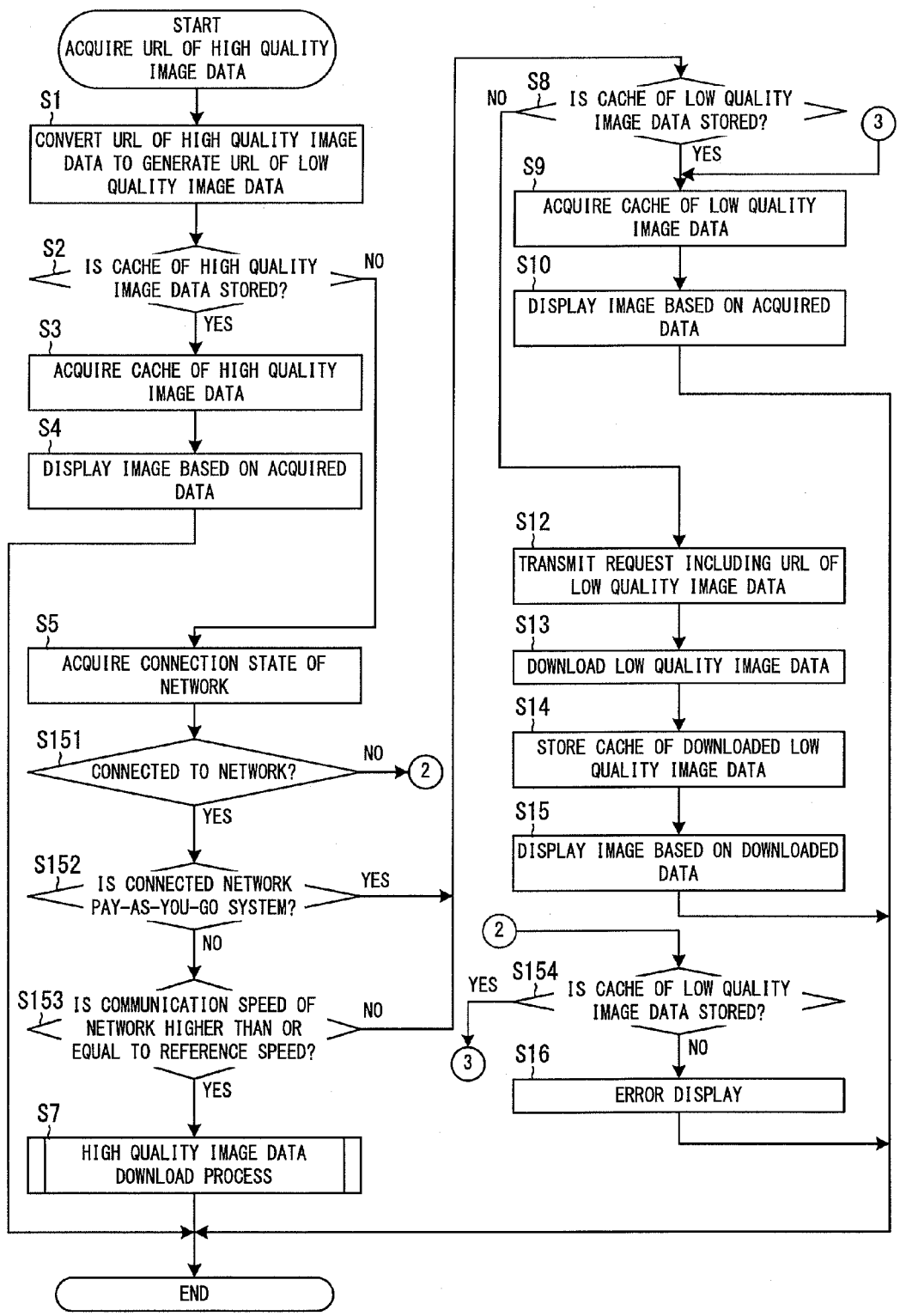
FIG. 8 is a flowchart showing a process example of an image data download process of the system control unit 29 of the mobile phone 2 according to an embodiment.

FIG. 8 is a flowchart showing a process example of an image data download process of the system control unit 29 of the mobile phone 2 according to the present embodiment. In FIG. 8, the same steps as those in FIG. 4 are denoted by the same step numbers.

In the same manner as in the first embodiment, the system control unit 29 performs the processes of steps S1 to S5. When the system control unit 29 completes the process of step S5, the system control unit 29 determines whether or not the mobile phone 2 is currently connected to the wireless LAN 6 or the mobile communication network 7 on the basis of the connection state of the network (step S151). At this time, if the system control unit 29 determines that the mobile phone 2 is not connected to any network (step S151: NO), the system control unit 29 determines whether or not the cache of the low quality image data is stored in the storage unit 23 (step S154). At this time, if the system control unit 29 determines that the cache of the low quality image data is stored (step S154: YES), the system control unit 29 displays an image based on the cache of the low quality image data (step S9 and step S10) and ends the image data download process. On the other hand, if the system control unit 29 determines that the cache of the low quality image data is not stored (step S154: NO), the system control unit 29 displays an error message (step S16) and ends the image data download process.

In step S151, if the system control unit 29 determines that the mobile phone 2 is connected to any of the networks (step S151: YES), the system control unit 29 acquires the fee system information of the connected network. Then, the system control unit 29 determines whether or not the fee system of the connected network is the pay-as-you-go system on the basis of the fee system information (step S152). At this time, if the system control unit 29 determines that the fee system is the pay-as-you-go system (step S152: YES), the system control unit 29 determines whether or not the cache of the low quality image data is stored in the storage unit 23 (step S8). At this time, if the system control unit 29 determines that the cache of the low quality image data is stored (step S8: YES), the system control unit 29 displays an image based on the cache of the low quality image data (step S9 and step S10) and ends the image data download process. On the other hand, if the system control unit 29 determines that the cache of the low quality image data is not stored (step S8: NO), the system control unit 29 downloads the low quality image data and displays an image based on the downloaded low quality image data (step S12 to step S15). At this time, the system control unit 29 downloads the low quality image data from the connected network regardless of whether or not the connected network is the mobile communication network 7. When the system control unit 29 completes the process of step S15, the system control unit 29 ends the image data download process.

In step S152, if the system control unit 29 determines that the fee system is not the pay-as-you-go system (step S152: NO), that is, if the system control unit 29 determines that the fee system of the connected network is the flat-rate system or the packet communication fee is free, the system control unit 29 acquires the communication speed of the connected network. Then, the system control unit 29 determines whether or not the communication speed of the connected network is higher than or equal to the reference speed (step S153). As the connection determination means, the system control unit 29 performs the determinations of steps S151 to S153, so that the system control unit 29 determines whether or not the mobile phone 2 is connected to a network where the communication speed is the high speed and the fee system is the flat-rate system or the communication fee is free. At this time, if the system control unit 29 determines that the communication speed is lower than the reference speed (step S153: NO), the system control unit 29 proceeds to step S8. On the other hand, if the system control unit 29 determines that the communication speed is higher than or equal to the reference speed (step S153: YES), the system control unit 29 performs the high quality image data download process (step S7) and ends image data download process. In the high quality image data download process, the high quality image data is downloaded from the connected network regardless of whether or not the connected network is the wireless LAN 6.

As described above, according to the present embodiment, the same effects as those of the first embodiment can be obtained. As compared with the case of the first embodiment, it is possible to control the download of image data more corresponding to the actual situation.

In the second embodiment, both the communication speed and the fee system of the network are determined. However, only either one of the communication speed and the fee system may be determined. For example, when the fee systems of all networks to which the mobile phone 2 may connect are the flat-rate system or free, the system control unit 29 may determine only the communication speed. For example, when the fee systems of all networks to which the mobile phone 2 may connect are the pay-as-you-go system, the system control unit 29 may determine only the communication speed.

Specifically, if the system control unit 29 determines that the mobile phone 2 is connected to any of the networks (step S151: YES) in the image data download process, the system control unit 29 performs the determination of step S153 without performing the determination of step S152. The system control unit 29 may determine only the fee system. In this case, the communication speeds of all networks to which the mobile phone 2 may connect may be only the high speed, only the low speed, or a combination of the high speed and the low speed. Specifically, if the system control unit 29 determines that the fee system of the connected network is not the pay-as-you-go system in the image data download process (step S152: NO), the system control unit 29 performs the high quality image data download process without performing the determination of step S153. In this case, when the fee system of the connected network is the flat-rate system or free, even if the communication speed is the low speed, the high quality image data is downloaded. This means that the quality of the displayed image is more prioritized than the time required for the download.

In the embodiments described above, the contents of the present invention are applied to the image. However, the contents of the present invention may be applied to contents other than the image. The first data and the second data of the present invention may be applied to data for outputting the applied contents. In this case, the first data and the second data are generated so that the quality of the contents outputted as the first data is higher than the quality of the contents outputted as the second data. Therefore, the amount of data of the first data is greater than that of the second data.

For example, when the contents of the present invention are applied to sound, the quality of the sound corresponds to the quality of the contents. Examples of factors that determine the quality of the sound include a sampling frequency, a quantization bit rate, a bit rate, the number of channels, lossy/lossless compression of the sound, and a compression ratio when the sound is lossy compressed. For example, when the contents of the present invention are applied to a moving image, the quality of the moving image or the quality of the sound reproduced along with the moving image corresponds to the quality of the contents. Examples of factors that determine the quality of the moving image include the number of pixels in an image per frame (resolution), a bit length of color information assigned to one pixel, a frame rate, lossy/lossless compression of the moving image, and a compression ratio when the moving image is lossy compressed.

The contents of the present invention may be applied to an electronic document including an image, a sound, a moving image, or the like. In this case, the first data and the second data for outputting the electronic document include data of an image, a sound, or a moving image. The contents of the present invention may be applied to an RIA which displays an image, a sound, a moving image, or the like and which includes an image, a sound, a moving image, or the like.

It is not an essential condition for the first data and the second data associated with each other to have exactly the same content of the outputted contents. For example, the first data and the second data may have different amounts of data depending on the amount of information transmitted to the user by the outputted contents. Specifically, the amount of information transmitted by the first data is set to be greater than the amount of information transmitted by the second data. In this case, the qualities of the contents outputted by the first data and the second data may be the same.

For example, in a case of an image, a creator of the contents generates the first data of an image A and generates the second image by extracting a part of the image A as an image B. In this case, the number of pixels of the image A is greater than that of the image B, so that the amount of data of the first data is greater than that of the second data. When the image A and the image B are displayed in the same size, the resolution of the image A is higher than that of the image B. The extracted portion may be, for example, an important portion of the original image.

In a case of sound, a recording time of the sound may be different between the first data and the second data. Specifically, the recording time of the sound reproduced by the first data is set to be longer than the recording time of the sound reproduced by the second data. Thereby, the amount of data of the first data is greater than that of the second data. For example, in a case of a voice, a sound in which detailed content is spoken may be reproduced by the first data and a sound in which summarized content is spoken may be reproduced by the second data. For example, in a case of music, a sound of full music may be reproduced by the first data and a sound of the introduction or the bridge of the music may be reproduced by the second data.

In a case of a moving image, in the same manner as in the image, a creator generates the first data of a moving image and generates the second image by extracting a part of image of each frame of the moving image. Or, a recording time of the moving image may be different between the first data and the second data. Specifically, the recording time of the moving image reproduced by the first data is set to be longer than the recording time of the moving image reproduced by the second data. For example, the moving image reproduced by the second data may be a digest version of the moving image reproduced by the first data.

In a case of a text and an electronic document, the number of written characters may be different between the first data and the second data. Specifically, the number of characters of sentences displayed by the first data is set to be greater than the number of characters of sentences displayed by the second data. Thereby, the amount of data of the first data is greater than that of the second data. For example, the sentences displayed by the second data may be an abstract of the sentences displayed by the first data.

In the embodiments described above, the terminal device of the present invention is applied to the mobile phone 2. However, the terminal device of the present invention may be applied to, for example, a portable terminal device such as a PDA (Personal Digital Assistant) and a notebook PC and a stationary type terminal device such as a desktop computer and a set-top box.

In the embodiment described above, the data receiving program of the present invention is applied to the download application executed by the mobile phone 2. However, the data receiving program may be applied to, for example, an application program such as a browser, a program of a status bar displayed on a window of a specific application program, and a program of a widget displayed on a screen at all times.

In the embodiment described above, the first network and the second network of the present invention are applied to the wireless LAN and the mobile communication network. However, the first network and the second network may be applied to networks other than the wireless LAN and the mobile communication network. In this case, at least one of the first network and the second network may be a wired network.

In the description of the above embodiments, a network where the fee system is the flat-rate system or the packet communication fee is free is the first network and a network where the fee system is the pay-as-you-go system is the second network. However, the fee systems of both the first network and the second network may be the pay-as-you-go system. In the fee system of the second network, the packet communication fee charged according to the amount of communication is higher than that of the first network.

In the embodiment described above, even when the terminal device is connected to the first network, if the terminal device has already stored the first data, the terminal device does not download the first data. However, even if the terminal device has already stored the first data, the terminal device may download the first data through the first network and output contents based on the downloaded first data. Similarly, even if the terminal device has already stored the second data, when the terminal device is connected to the second network, the terminal device may download the second data through the second network and output contents based on the downloaded second data.

As described in the first embodiment, it may not be necessary to determine whether or not the terminal device is connected to the second network. For example, in an environment in which it is assumed that the terminal device is connected to the second network at all times, it is not necessary to determine whether or not the terminal device is connected to the second network. The present invention is an invention based on a fact that there is a case in which the terminal device cannot connect to the first network that is more preferable to the user.

REFERENCE SIGNS LIST

1 Web server
2. Mobile phone
3 Access point
4 Wireless base station
5 Network
6 Wireless LAN
7 Mobile communication network
11 Communication unit
12 Storage unit
13 Input/output interface
14 System control unit
14a CPU
14b ROM
14c RAM
15 System bus
21 Wireless LAN communication unit
22 Mobile wireless communication unit
23 Storage unit
24 Display unit
25 Operation unit
26 Speaker
27 Microphone
28 Input/output interface
29 System control unit
29a CPU
29b ROM
29c RAM
30 System bus
S Download system

The invention claimed is:

1. A terminal device that data, which is used to output contents, through at least either one of a first network and a second network being at least either one of a network whose communication speed is lower than that of the first network and a network whose communication fee charged according to an amount of communication is higher than that of the first network, the terminal device comprising:

at least one memory operable to store program code;
at least one processor operable to read said program code and operate as instructed by said program code, said program code including:
connection determination code that causes said at least one processor to determine whether or not the terminal device is connected to the first network;
identification information acquisition code that causes said at least one processor to acquire identification information of either one of first data and second data, an amount of data of the second data being smaller than that of the first data, the identification information being identification information by which a transmitting device identifies data which the transmitting device that transmits data is requested to transmit;
generation code that causes said at least one processor to generate identification information of the other of the first data and the second data on the basis of the identification information acquired by the identification information acquisition code and a conversion rule between the first data and the second data;
first storage determination code that causes said at least one processor to determine whether or not data corresponding to the identification information acquired by the identification information acquisition code and data corresponding to the identification information generated by the generation code are stored in a storage;
receiving code that causes said at least one processor to receive the first data through the first network when it is determined that the terminal device is connected to the first network and receive the second data through the second network when it is determined that the terminal device is not connected to the first network and the first data is not stored in the storage, the receiving code causes said at least one processor to transmit the identification information acquired by the identification information acquisition code or the identification information generated by the generation code to the transmitting device and thereby receiving data identified by the transmitted identification information from the transmitting device;
control code that causes said at least one processor to store data received by the receiving code in the storage in association with the identification information of the received data; and
output code that causes said at least one processor to output the contents based on the first data when it is determined that the first data is stored in the storage and output the contents based on the second data when it is determined that only the second data is stored in the storage.

2. A terminal device that data, which is used to output contents, through at least either one of a first network and a second network being at least either one of a network whose communication speed is lower than that of the first network and a network whose communication fee charged according to an amount of communication is higher than that of the first network, the terminal device comprising:

at least one memory operable to store program code;
at least one processor operable to read said program code and operate as instructed by said program code, said program code including:
connection determination code that causes said at least one processor to determine whether or not the terminal device is connected to the first network;
first storage determination code that causes said at least one processor to determine whether or not first data and second data are stored in a storage, an amount of data of the second data being smaller than that of the first data;
receiving code that causes said at least one processor to receive the first data through the first network when it is determined that the terminal device is connected to the first network and receive the second data through the second network when it is determined that the terminal device is not connected to the first network and the first data is not stored in the storage;
control code that causes said at least one processor to store data received by the receiving code in the storage;
deletion code that causes said at least one processor to delete the second data corresponding to the first data stored in the storage by the control code from the storage; and
output code that causes said at least one processor to output the contents based on the first data when it is determined that the first data is stored in the storage and output the contents based on the second data when it is determined that only the second data is stored in the storage.

3. A terminal device that data, which is used to output contents, through at least either one of a first network and a second network being at least either one of a network whose communication speed is lower than that of the first network and a network whose communication fee charged according to an amount of communication is higher than that of the first network, the terminal device comprising:
at least one memory operable to store program code;
at least one processor operable to read said program code and operate as instructed by said program code, said program code including:
connection determination code that causes said at least one processor to determine whether or not the terminal device is connected to the first network;
first storage determination code that causes said at least one processor to determine whether or not first data and second data are stored in a storage, an amount of data of the second data being smaller than that of the first data;
receiving code that causes said at least one processor to receive the first data through the first network when it is determined that the terminal device is connected to the first network and receive the second data through the second network when it is determined that the terminal device is not connected to the first network and the first data is not stored in the storage;
control code that causes said at least one processor to store data received by the receiving code in the storage;
output code that causes said at least one processor to output the contents based on the first data when it is determined that the first data is stored in the storage and output the contents based on the second data when it is determined that only the second data is stored in the storage;
second storage determination code that causes said at least one processor to determine whether or not the first data corresponding to the second data stored in the storage is stored in the storage at a predetermined timing;
first data receiving code that causes said at least one processor to receive the first data determined not to be stored by the second storage determination code through the first network when the terminal device is connected to the first network.

4. A terminal device that data, which is used to output contents, through at least either one of a first network and a second network being at least either one of a network whose communication speed is lower than that of the first network and a network whose communication fee charged according to an amount of communication is higher than that of the first network, the terminal device comprising:
at least one memory operable to store program code;
at least one processor operable to read said program code and operate as instructed by said program code, said program code including:
connection determination code that causes said at least one processor to determine whether or not the terminal device is connected to the first network;
first storage determination code that causes said at least one processor to determine whether or not first data and second data are stored in a storage, an amount of data of the second data being smaller than that of the first data;
receiving code that causes said at least one processor to receive the first data through the first network when it is determined that the terminal device is connected to the first network and receive the second data through the second network when it is determined that the terminal device is not connected to the first network and the first data is not stored in the storage;
control code that causes said at least one processor to store data received by the receiving code in the storage; and
output code that causes said at least one processor to output the contents based on the first data when it is determined that the first data is stored in the storage, output the contents based on the second data when it is determined that only the second data is stored in the storage, and output contents based on the second data stored in the storage and thereafter output contents based on the first data received by the receiving code when it is determined that the terminal device is connected to the first network and only the second data is stored.

5. A terminal device that data, which is used to output contents, through at least either one of a first network and a second network being at least either one of a network whose communication speed is lower than that of the first network and a network whose communication fee charged according to an amount of communication is higher than that of the first network, the terminal device comprising:
at least one memory operable to store program code;
at least one processor operable to read said program code and operate as instructed by said program code, said program code including:
connection determination code that causes said at least one processor to determine whether or not the terminal device is connected to the first network;
first storage determination code that causes said at least one processor to determine whether or not first data and second data are stored in a storage, an amount of data of the second data being smaller than that of the first data;
receiving code that causes said at least one processor to receive the first data through the first network when it is determined that the terminal device is connected to the first network and receive the second data through the second network when it is determined that the terminal device is not connected to the first network and the first data is not stored in the storage;
disconnection determination code that causes said at least one processor to determine whether or not a connection with the first network is disconnected;
control code that causes said at least one processor to store data received by the receiving code in the storage; and
output code that causes said at least one processor to output the contents based on the first data when it is determined that the first data is stored in the storage, output the contents based on the second data when it is determined that only the second data is stored in the storage and output contents based on the second data when it is determined that the connection with the first network is disconnected while the receiving code is receiving the first data and it is determined that the second data is stored.

6. A terminal device that data, which is used to output contents, through at least either one of a first network and a second network being at least either one of a network whose communication speed is lower than that of the first network and a network whose communication fee charged according to an amount of communication is higher than that of the first network, the terminal device comprising:
- at least one memory operable to store program code;
- at least one processor operable to read said program code and operate as instructed by said program code, said program code including:
- connection determination code that causes said at least one processor to determine whether or not the terminal device is connected to the first network;
- first storage determination code that causes said at least one processor to determine whether or not first data and second data are stored in a storage, an amount of data of the second data being smaller than that of the first data;
- load information acquisition code that causes said at least one processor to acquire load information indicating a load of the first network when it is determined that the first data is not stored and the terminal device is connected to the first network;
- load determination code that causes said at least one processor to determine whether or not the load indicated by the load information is greater than or equal to a predetermined threshold value;
- receiving code that causes said at least one processor to receive the first data through the first network when it is determined that the load is smaller than the threshold value, receive the second data through the first network and thereafter receive the first data through the first network when it is determined that the load is greater than or equal to the threshold value, and receive the second data through the second network when it is determined that the terminal device is not connected to the first network and the first data is not stored in the storage;
- control code that causes said at least one processor to store data received by the receiving code in the storage code; and
- output code that causes said at least one processor to output the contents based on the first data when it is determined that the first data is stored in the storage, output the contents based on the second data when it is determined that only the second data is stored in the storage, and output contents based on the second data received by the receiving code and thereafter output contents based on the first data received by the receiving code when it is determined that the load is greater than or equal to the threshold value.

\* \* \* \* \*